United States Patent
Mandella et al.

(10) Patent No.: US 6,351,325 B1
(45) Date of Patent: Feb. 26, 2002

(54) FIBER-COUPLED, ANGLED-DUAL-AXIS CONFOCAL SCANNING MICROSCOPES FOR IMAGING IN A SCATTERING MEDIUM

(75) Inventors: Michael J. Mandella, Cupertino; Mark H. Garrett, Morgan Hill; Gordon S. Kino, Stanford, all of CA (US)

(73) Assignee: Optical Biopsy Technologies, Inc., Santa Clara, CA (US)

(*) Notice: Subject to any disclaimer, the term of this patent is extended or adjusted under 35 U.S.C. 154(b) by 0 days.

(21) Appl. No.: 09/627,363

(22) Filed: Jul. 28, 2000

(51) Int. Cl.$^7$ .......................... G02B 26/08; G02B 21/06
(52) U.S. Cl. ...................... 359/210; 359/372; 359/382; 359/383; 359/389; 359/393; 359/900
(58) Field of Search ................. 359/196–226, 359/368, 372, 383, 382, 385, 389–393, 900; 250/201.3, 234–236; 385/31, 33, 88

(56) References Cited

U.S. PATENT DOCUMENTS

| 5,120,953 A | 6/1992 | Harris ......................... 250/224 |
| 5,161,053 A | 11/1992 | Dabbs ......................... 359/384 |
| 5,321,501 A | 6/1994 | Swanson et al. ............. 356/345 |
| 5,969,854 A | 10/1999 | Stelzer et al. ................ 359/385 |
| 5,973,828 A | 10/1999 | Webb ......................... 359/385 |

(List continued on next page.)

FOREIGN PATENT DOCUMENTS

DE    4326473    2/1985

OTHER PUBLICATIONS

Rollins et al., "SNR analysis of conventional and optimal fiber–optic low–coherence interferometer topologies", In Coherence Domain Optical Methods in Biomedical Science and Clinical Applications IV, Proceedings of SPIE, vol. 3915, 2000, pp. 60–67. (No month).

Rollins et al., "Optimal Interferometer designs for optical coherence tomography", Optics Letters, vol. 24, No. 21, Nov. 1, 1999, pp. 1484–1486.

Podoleanu, "Unbalanced versus balanced operation in an optical coherence tomography system", Applied Optics, vol. 39, No. 1, Jan. 1, 2000, pp. 173–182.

(List continued on next page.)

Primary Examiner—James Phan
(74) Attorney, Agent, or Firm—Lumen Intellectual Property Services, Inc.

(57) ABSTRACT

This invention provides an angled-dual-axis confocal scanning microscope comprising a fiber-coupled, angled-dual-axis confocal head and a vertical scanning unit. The angled-dual-axis confocal head is configured such that an illumination beam and an observation beam intersect optimally at an angle θ within an object. The vertical scanning unit causes the angled-dual-axis confocal head to move towards or away from the object, thereby yielding a vertical scan that deepens into the object, while keeping the optical path lengths of the illumination and observation beams unchanged so to ensure the optimal intersection of the illumination and observation beams in the course of vertical scanning. The angled-dual-axis confocal scanning microscope may further comprises a transverse stage, causing the object to move relative to the angled-dual-axis confocal head along transverse directions perpendicular to the vertical direction, thereby producing a transverse scan. By assembling various transverse and/or vertical scans in a suitable manner, two-dimensional transverse and/or vertical cross-section images of the object can be obtained. A three-dimensional volume image of the object can be accordingly constructed. The angled-dual-axis confocal scanning microscope of the present invention provides a versatile and high resolution imaging tool, well suited for tissue and other biological imaging applications. Moreover, by employing relatively low numerical aperture focusing elements, fiber-optic components and a fiber-coupled laser, the present invention provides an assembly of fiber-based angled-dual-axis confocal systems that can be particularly powerful tools for performing low noise confocal scanning microscopy in a scattering medium.

89 Claims, 13 Drawing Sheets

U.S. PATENT DOCUMENTS

| | | | |
|---|---|---|---|
| 6,028,306 A | 2/2000 | Hayashi | 250/235 |
| 6,057,952 A | 5/2000 | Kubo et al. | 359/196 |
| 6,064,518 A | 5/2000 | Stelzer et al. | 359/368 |
| 6,069,698 A | 5/2000 | Ozawa et al. | 356/345 |
| 6,088,145 A | 7/2000 | Dickensheets et al. | 359/196 |
| 6,134,003 A | 10/2000 | Tearney et al. | 356/345 |

OTHER PUBLICATIONS

Lindek et al., "Optical transfer functions for Confocal theta fluorescence microscopy", J. Opt. Soc. Am. A, vol. 13, No. 3, Mar. 1996, pp. 479–482.

Stelzer et al., "Fundamental reduction of the observation volume in far–field light microcopy by detection orthogonal to the illumination axis: confocal theta microscopy", Optics Communications 111 (Oct. 15, 1994), pp. 536–547.

Hell et al., "Far–field fluorescence microscopy with three–dimensional resolution in the 100–nm range", Journal of Microscopy, vol. 187, Pt. 1, Jul. 1997, pp. 1–7.

Stelzer et al., "A new tool for the observation of embryos and other large specimens: confocal theta fluorescence microscopy", Journal of Microscopy, vol. 179, Pt. 1, Jul. 1995, pp. 1–10.

Webb et al., "Confocal microscope with large field and working distance", Applied Optics, vol. 38, No. 22, Aug. 1, 1999, pp. 4870–4875.

Sinzinger et al., "Planar optical Confocal microscope for imaging and sensing" European Optical Society Topical Meetings Digest Series, vol. 9, Engelberg, Switzerland, Apr. 19996, pp. 1–3.

Klug et al., "Implementation of multilens micro–optical systems with large numerical aperture by stacking of microlenses", Applied Optics, vol. 38, No. 34, Dec. 1, 1999.

Drexler et al., "In vivo ultrahigh–resolution optical coherence tomography", Optics Letters, vol. 24, No. 17, Sep. 1, 1999.

Wang et al., "High Speed, full field optical coherence microscopy", Proceedings of the SPIE Conference on Coherence Domain Optical Methods in Biomedical Science and Clinical Applications III, San Jose, California, Jan. 1999, pp. 204–212.

FIBER-COUPLED, ANGLED-DUAL-AXIS CONFOCAL SCANNING MICROSCOPES FOR IMAGING IN A SCATTERING MEDIUM

CROSS-REFERENCE TO RELATED APPLICATIONS

This application is related to the following copending U.S. Patent Applications, all of which are herein incorporated by reference: "Fiber-coupled, High-speed, Integrated, Angled-Dual-Axis Confocal Scanning Microscopes Employing Vertical Cross-Section Scanning" of Michael J. Mandella, Mark H. Garrett, and Gordon S. Kino, 09/628,118; and "Fiber-coupled, High-speed, Angled-Dual-Axis Optical Coherence Scanning Microscopes" of Michael J. Mandella, Mark H. Garrett, and Gordon S. Kino, 09/628,119.

FIELD OF THE INVENTION

This invention relates generally to the field of confocal microscopes, and in particular, to a new class of fiber-coupled, angled-dual-axis confocal microscopes that provide enhanced resolution, low noise, and large field of view.

BACKGROUND ART

The advent of fiber optics and laser technology has brought a renewed life to many areas of conventional optics. Confocal microscopes, for example, have enjoyed higher resolution, more integrated structure, and enhanced imaging capability. Consequently, confocal microscopes have become increasingly powerful tools in a variety of applications, including biological and medical imaging, optical data storage and industrial applications.

The original idea of confocal microscopy traces back to the work of Marvin Minsky. Described in his seminal U.S. Pat. No. 3,013,467 is a system in which an illumination beam passes through a pinhole, traverses a beamsplitter, and is focused by an objective to a focal volume within an object. An observation beam that emanates from the focal volume is in turn converged by the same objective lens, reflected by its second encounter with the beamsplitter, and passes through a second pinhole to an optical detector. The geometry of this confocal arrangement is such that only the light beam originating from the focal volume is able to pass through the second pinhole and reach the optical detector, thus effectively discriminating all other out-of-focus signals.

Contemporary confocal microscopes tend to adopt one of two basic confocal geometries. In the transmission arrangement using two objectives, one objective focuses an illumination beam from a point source onto a focal volume within an object and another objective collects an observation beam that emanates from the focal volume. Whereas in the so-called "reciprocal" reflection arrangement, a single objective plays a dual role of focusing light on the object and collecting the light emanated from the object. In either case, the confocal arrangement enables the confocal microscope to attain a higher resolution and sharper definition than a conventional microscope, because out-of-focus signals are rejected. This unique ability has made confocal microscopes particularly useful tools in the examination of biological specimens, since they can view a specific layer within a sample and avoid seeing other layers, the so-called "optical sectioning".

In order to image a thin layer about a few micrometers thick within a sample, the numerical aperture (NA) of the objective lenses must be large, so as to provide adequate resolution particularly in the axial direction. Employing large NA objectives in confocal microscopes generally results in a short working distance, and small field of view. Moreover, when imaging within tissue or scattering media, the signal is typically dominated by scattering from points far away from the focus of the large NA objective, thus resulting in noisy (low contrast) images.

A great deal of ingenuity has accordingly been devoted to improving the axial resolution of confocal microscopes without using high NA lenses. A particularly interesting approach is to spatially arrange the illumination and observation objective lenses, or the illumination and observation beam paths, in such a way that the illumination and observation beams intersect at an angle theta ($\theta$) at the target point, so that the confocal overlapping volume of the illumination and observation point-spread functions is substantially reduced in the axial direction. A confocal microscope with such an angled, dual-axis design is termed a confocal theta microscope, or an angled-dual-axis confocal microscope, hereinafter. The underlying principle and the advantages of confocal theta microscopy are described in U.S. Patent Application "Fiber-Coupled, High-speed, Integrated, Angled-Dual-Axis Confocal Scanning Microscopes Employing Vertical Cross-Section Scanning" of Michael J. Mandella, Mark H. Garrett, and Gordon S. Kino, 09/628,118, filed on Jul. 28, 2000, incorporated herein by reference for all purposes. A detailed theory of confocal theta microscopy is also given in U.S. Pat. No. 5,973,828; by Webb et al. in "Confocal microscope with large field and working distance", Applied Optics, Vol.38, No.22, pp.4870; and by Stelzer et al. in "A new tool for the observation of embryos and other large specimens: confocal theta fluorescence microscopy", Journal of Microscopy, Vol.179, Part 1, pp. 1; all incorporated by reference.

More specifically, 09/628,118 discloses a confocal theta microscope comprising an angled-dual-axis confocal scanning head mechanically coupled to a vertical scanning unit. The angled-dual-axis confocal scanning head is configured such that the illumination and observation beams intersect optimally at a fixed angle $\theta$ within an object and the scanning is achieved by pivoting the illumination and observation beams jointly using a single high-speed scanning element, thereby producing an arc-line scan. The vertical scanning unit causes the angled-dual-axis confocal scanning head to move towards or away from the object, thereby yielding a vertical scan, while keeping the optical path lengths of the illumination and observation beams unchanged so as to ensure the optimal intersection of the illumination and observation beams in the course of vertical scanning. By assembling a plurality of arc-line scans that progressively deepen into the object, a vertical cross-section scan can be constructed. This novel scanning mechanism, along with the integrated structure of the angled-dual-axis confocal scanning head and the coupling of optical fibers, renders this angled-dual-axis confocal scanning microscope particularly suitable for applications where high resolution and fast scanning are required, such as in vivo imaging of live tissue which is constantly in motion.

In the applications where the speed at which scanning is performed is not critical to creating an image, such as imaging surgically removed tissue or specimens in biological and medical applications, the sample to be examined can be moved while keeping the illumination and observation beams stationary. This alternative approach provides more freedom in the way that the scanning is carried out, and also enables the corresponding confocal microscope itself to be simpler in structure and consequently more versatile in performance. An additional bonus of moving the sample and hence scanning at slower rates is that the integration time in data collection is relatively longer, therefore enhancing the signal-to-noise ratio of detection.

In recent years optical fibers have been used in confocal systems to transmit light more flexibly. A single-mode fiber is typically used so that an end of the fiber is also conveniently utilized as a pinhole for both light emission and detection. This arrangement is not susceptible to the alignment problems the mechanical pinholes in the prior art systems tend to suffer. Moreover, the use of optical fibers enables the microscopes to be more flexible and compact in structure, along with greater maneuverability in scanning. U.S. Pat. Nos. 5,120,953, 5,161,053, 5,742,419 and 5,907,425, for instance, disclose conventional reciprocal confocal scanning microscopes using a single optical fiber to transmit light. The end of the fiber provides a point illumination source and a point detector. The scanning in these systems is achieved by maneuvering the fiber end. Confocal theta microscopy is not employed in these systems, however.

Hence, there is a need in the art for a fiber-based confocal microscope that is simple in construction, versatile in scanning, and exploits the enhanced resolution and low noise performance brought about by confocal theta microscopy, as well as the flexibility, scalability, ruggedness, and low cost afforded by optical fibers.

OBJECTS AND ADVANTAGES

Accordingly it is a principal object of the present invention to provide an angled-dual-axis confocal scanning microscope for imaging in tissue or a scattering medium that:

a) attains improved axial resolution;

b) provides a longer working distance and a large field of view;

c) achieves higher sensitivity and larger dynamic range of detection;

d) is fiber-coupled;

e) uses inexpensive focusing elements;

f) has higher power efficiency;

g) performs two-dimensional cross-sectional or three-dimensional volume scanning; and h) has small, compact, integrated, and simple construction.

It is a further object of the present invention to provide an assembly of fiber-based angled-dual-axis confocal scanning systems that advantageously combine the angled-dual-axis confocal scanning microscope of the present invention and fiber-optic components.

These and other objects and advantages will become apparent from the following description and accompanying drawings.

SUMMARY OF THE INVENTION

This invention provides an angled-dual-axis confocal scanning microscope, comprising an angled-dual-axis confocal head and a vertical scanning unit. The angled-dual-axis confocal head further comprises a first end of a first single-mode optical fiber serving as a point light source, an angled-dual-axis focusing means, and a first end of a second single-mode optical fiber serving as a point light detector.

From the first end of the first optical fiber an illumination beam emerges. The angled-dual-axis focusing means serves to focus the illumination beam to a diffraction-limited illumination focal volume along an illumination axis within an object. The angled-dual-axis focusing means further receives an observation beam emanated from an observation focal volume along an observation axis within the object, and focuses the observation beam to the first end of the second optical fiber. The angled-dual-axis focusing means is designed such that the illumination axis and the observation axis intersect at an angle θ with the object, whereby the illumination and observation focal volumes intersect optimally at a confocal overlapping volume. The vertical scanning unit comprises a vertical translation means and a compensation means. The vertical translation means is mechanically coupled to the angled-dual-axis confocal head, such that it causes the angled-dual-axis confocal head to move towards or away from the object, thereby providing a vertical scan that deepens into the interior of the object. The compensation means keeps the optical path lengths of the illumination and observation beams substantially unchanged, thereby ensuring the optimal intersection of the illumination and observation focal volumes in the course of vertical scanning. Altogether, the angled-dual-axis confocal scanning microscope of the present invention is capable of performing vertical scanning with enhanced axial (i.e., vertical) resolution, while maintaining a workable working distance and a large field of view.

The angled-dual-axis confocal scanning microscope described above may be further equipped with a transverse stage mechanically coupled to the object, serving to translate the angled-dual-axis confocal head relative to the object in a transverse plane perpendicular to the vertical direction. Alternatively, the object itself may be moved (e.g., driven by an external mechanism) transversely relative to the angled-dual-axis confocal head in various directions perpendicular to the vertical direction. As such, the angled-dual-axis confocal scanning microscope of the present invention is capable of providing vertical scans and transverse scans in various ways. Moreover, by assembling an assortment of the vertical and/or transverse scans in a suitable manner, two-dimensional transverse and/or vertical cross-section scans of the object can be obtained. A three-dimensional volume image of the object can also be accordingly constructed.

It is to be understood that the term "emanating" as used in this specification is to be construed in a broad sense as covering any light transmitted back from the object, including reflected light, scattered light, and fluorescent light. It should be also understood that when describing the intersection of the illumination and observation beams in this specification, the term "optimal" means that the illumination and observation focal volumes (i.e., the main lobes of the illumination beam's point-spread function and the observation beam's point-spread function) intersect in such a way that their respective centers substantially coincide and the resulting overlapping volume has comparable transverse and axial extents. This optimal overlapping volume is termed "confocal overlapping volume" in this specification.

In an angled-dual-axis confocal head of the present invention, the angled-dual-axis focusing means generally comprises an assembly of beam focusing, collimating, and deflecting elements. Such elements can be selected from the group of refractive lenses, diffractive lenses, GRIN lenses, focusing gratings, micro-lenses, holographic optical elements, binary lenses, curved mirrors, flat mirrors, prisms and the like. A crucial feature of the angled-dual-axis focusing means is that it provides an illumination axis and an observation axis that intersect at an angle θ. The optical fibers can be single-mode fibers, multi-mode fibers, birefringent fibers, polarization maintaining fibers and the like.

Single-mode fibers are preferable in the present invention, for the ends of single-mode fibers provide a nearly point-like light source and detector.

An important advantage of the angled-dual-axis arrangement of the present invention is that since the observation beam is positioned at an angle relative to the illumination beam, scattered light along the illumination beam does not easily get passed into the observation beam, except where the beams overlap. This substantially reduces scattered photon noise in the observation beam, thus enhancing the sensitivity and dynamic range of detection. This is in contrast to the direct coupling of scattered photon noise between the illumination and observation beams in a transmission or reciprocal confocal microscope, due to the collinear arrangement between the beams. Moreover, by using low NA focusing elements (or lenses) in an angled-dual-axis confocal scanning system of the present invention, the illumination and observation beams do not become overlapping until very close to the focus. Such an arrangement further prevents scattered light in the illumination beam from directly "jumping" to the observation beam, hence further filtering out scattered photon noise in the observation beam. Altogether, the angled-dual-axis confocal system of the present invention has much lower noise and is capable of providing much higher contrast when imaging in a scattering medium than the prior art confocal systems employing high NA lenses, rendering it highly suitable for imaging within biological specimens.

Another advantage of the present invention is that the entire angled-dual-axis confocal head can be mounted on a silicon substrate etched with precision V-grooves which host various optical elements. Such an integrated device offers a high degree of integrity, maneuverability, scalability, versatility, simple construction, and easy alignment.

The present invention further provides a first angled-dual-axis confocal scanning system, comprising an angled-dual-axis confocal scanning microscope of the present invention, a light source, and an optical detector. The light source is optically coupled to the second end of the first optical fiber of the angled-dual-axis confocal scanning microscope, providing an illumination beam; and the optical detector is optically coupled to a second end of the second optical fiber of the angled-dual-axis confocal scanning microscope, receiving an observation beam collected from an object. The light source can be a continuous wave (CW) or a pulsed source such as a fiber laser, a semiconductor optical amplifier, an optical fiber amplifier, a semiconductor laser, a diode pumped solid state laser, or other suitable fiber-coupled light source known in the art. The optical detector can be a PIN diode, an avalanche photo diode (APD), or a photomultiplier tube. Such an angled-dual-axis confocal scanning system provides a simple and versatile imaging tool with high resolution and fast scanning capability.

It is known in the art that many biological tissues, such as tendons, muscle, nerve, bone, cartilage and teeth, exhibit birefrigence due to their linear or fibrous structure. Birefrigence causes the polarization state of light to be altered (e.g., rotated) in a prescribed manner upon refection. Skin is another birefrigent medium. Collagen contained in skin is a weakly birefrigent material. At temperatures between 56–65° C., collagen denatures and loses its birefrigence. Thus, by detecting induced changes in the polarization state of light reflected from a skin sample, an image representing the regions of skin where thermal injury occurs can be identified. The angled-dual-axis confocal scanning system described above can be modified to image such a birefrigent-scattering (or other polarization-altering) medium. A polarized light source is optically coupled to a second end of the first optical fiber of the angled-dual-axis confocal scanning microscope, providing a polarized illumination beam. The birefrigent (or other polarization-altering) "scatterers" emanate an observation beam whose polarization is altered (e.g., rotated) relative to the polarization of the illumination beam. Such a rotated polarization can be represented in two orthogonal polarization components. A polarizing beamsplitter is then optically coupled to a second end of the second optical fiber of the angled-dual-axis confocal scanning microscope, serving to route the two orthogonal polarization components of the observation beam to two separate optical detectors. An image representing the birefrigent (or other polarization-altering) "scatterers" can be accordingly constructed.

The present invention also provides an angled-dual-axis confocal scanning module, comprising an angled-dual-axis confocal scanning microscope of the present invention optically coupled to a non-reciprocal three-port optical circulator. The third and first ports of the optical circulator are optically coupled to the second ends of the first and second optical fibers of the angled-dual-axis confocal scanning microscope, respectively; and the second port of the optical circulator serves as a bi-directional input/output port. The configuration of the angled-dual-axis confocal scanning module is such that an illumination beam transmitted to the second port is in turn passed into the third port of the optical circulator and then coupled to the second end of the first optical fiber of the angled-dual-axis confocal scanning microscope in nearly its entirety; and an observation beam collected by the angled-dual-axis confocal scanning microscope is delivered to the first port and then routed to the second port of the optical circulator, to be further utilized or detected in nearly its entirety. As such, the angled-dual-axis confocal scanning module of the present invention provides a modular angled-dual-axis confocal scanning device with a single input/output port, and can be readily adapted in a variety of applications, as the following embodiments demonstrate.

For example, by coupling the angled-dual-axis confocal scanning module of the present invention to a first output aperture of a self-detecting laser source having two output apertures, an illumination beam is transmitted from the first output aperture of the laser to the angled-dual-axis confocal scanning module, and an observation beam collected by the module is in turn back coupled to the laser via the same output aperture. The feedback of the observation beam emanated from an object alters the light intensity as well as the modes supported by the laser cavity, and the resulting changes or perturbations can be detected by coupling an optical detector to a second output aperture of the laser. The presence of the non-reciprocal optical circulator in the angled-dual-axis confocal scanning module allows nearly 100% of the observation beam to be back coupled to the laser, hence maximizing the signal-to-noise ratio in detection. The use of a self-detecting laser as an integrated light source and detector further simplifies the structure of this angled-dual-axis confocal scanning system. Moreover, a frequency shifter (or a phase modulator) can be optically coupled to this angled-dual-axis confocal scanning system, arranged such that the frequency of the observation beam is shifted. The feedback of the frequency-shifted (or phase-modulated) observation beam to the laser results in the laser's output beam being modulated at a beat frequency, thereby allowing for more sensitive heterodyne detection. The system thus described constitutes the second angled-dual-axis confocal scanning system of the present invention.

If the self-detection laser source is equipped with only one output aperture, the angled-dual-axis confocal scanning module of the present invention can be optically coupled to the laser via a beam-splitting means, such as a 90/10 fiber-optic coupler or other low-coupling tap coupler. The beam-splitting means serves to divert a portion of the laser's output beam, which carries the perturbations due to the back coupling of the observation beam, to a detection path to which an optical detector may be coupled. Such a system constitutes the third angled-dual-axis confocal scanning system of the present invention.

The self-detecting characteristics of lasers have been advantageously exploited in the art to provide an integrated light source and detector, which also demonstrates the inherent high sensitivity of this method of optical detection. A great deal of effort has also been devoted to eliminate such sensitive feedback effects (e.g., optical isolators with non-reciprocal optical elements such as Faraday rotators are designed to eliminate or block the back-coupling of light). In the present invention, the self-detecting laser can be a fiber laser, a semiconductor laser, or a diode pumped solid state laser. A fiber-based laser system, such as the fiber laser disclosed by the inventors of this application in U.S. Pat. No. 5,887,009, may be used to take advantage of the inherent flexibility of laser cavity parameters. A semiconductor laser may also be desirable as a low cost device.

The angled-dual-axis confocal scanning module of the present invention can also be optically coupled to a light source via a second non-reciprocal, three-port optical circulator. In this embodiment, an output aperture of the light source is optically coupled to a first port of the second optical circulator and a second port of the second optical circulator is in turn optically coupled to the input/output port of the angled-dual-axis confocal scanning module, such that an illumination beam is passed from the light source into the angled-dual-axis confocal scanning module in nearly its entirety. The optical coupling between the second optical circulator and the angled-dual-axis confocal scanning module is preferably provided by a single optical fiber, though other optical coupling means can also be implemented. An observation beam collected by the angled-dual-axis confocal scanning module is then routed to a third port of the second optical circulator, which further leads to a detection path, preferably in the form of a detection optical fiber. An optical detector may be optically coupled to the detection optical fiber. In this angled-dual-axis confocal scanning system, the light source may be any suitable laser or non-laser source, which operates in either continuous or pulsed mode. In fact, a skilled artisan may implement any light source suitable for a given application. Moreover, the non-reciprocal nature of the second optical circulator allows nearly 100% of the observation beam to be used for detection, hence maximizing the signal-to-noise ratio. The system thus described constitutes the fourth angled-dual-axis confocal scanning system of the present invention.

The fourth angled-dual-axis confocal scanning system described above can be further modified into an interferometer configuration, such that the observation beam is combined with a portion of the output beam from the light source to create coherent interference. This can be achieved by inserting a beam-splitting means, such as a fiber-optic coupler or a beamsplitter, between the light source and the second optical circulator. In such an arrangement, the beam-splitting means diverts a portion of the output beam emitted from the light source to the first port of the second optical circulator, which is in turn routed to the angled-dual-axis confocal scanning module, providing an illumination beam.

The remainder of the output beam from the light source is diverted to a reference path, preferably in the form of a reference optical fiber, providing a reference beam. The third port of the second optical circulator then routes an observation beam collected by the angled-dual-axis confocal scanning module to a detection path, preferably in the form of a detection optical fiber. The reference and detection optical fibers may be coupled by a 50/50 fiber-optic coupler to mix the observation and reference beams, and produce two outputs with a $\pi$ phase difference for use in a balanced detection scheme. In this way, an interferometer is created and the length of the reference optical fiber can be adjusted to achieve coherent interference between the observation and reference beams.

The system described above, hence the fifth angled-dual-axis confocal scanning system of the present invention, may further include a frequency shifter (or a phase modulator), arranged such that the frequency of either the reference or the observation beam is shifted, so as to generate coherent heterodyne interference between the observation and reference beams. Heterodyne balanced detection technique, well-known in the art of optical coherence tomography (OCT), can be accordingly utilized. An adjustable optical delay device can also be implemented in such a way to maintain coherent interference between the reference and observation beams. If the light source has a short coherence length, then the delay can be adjusted such that only single-scattered light in the observation beam is coherent with the reference beam at the 50/50 fiber-optic coupler and multiple-scattered light, which traverse over a larger optical path length in the observation beam, does not contribute to the coherent interference, therefore providing further filtering of multiple-scattered light. To further enhance the signal-to-noise ratio in detection, an optical amplifier, such as a two-port fiber amplifier or a semiconductor optical amplifier (SOA), can be coupled to the detection optical fiber, such that the observation beam is amplified. An amplified observation beam allows faster scanning rates and consequently higher pixel rates without appreciable loss in signal-to-noise ratio, because a shorter integration time per pixel of an image is required in data collection.

The light source in the fifth angled-dual-axis confocal scanning system of the present invention can be an optical fiber amplifier, a semiconductor optical amplifier, a fiber laser, a semiconductor laser, a diode-pumped solid state laser, or a continuous wave or pulsed broadband OCT source having a short coherence length well known in the art of OCT. If polarized light is provided by the light source, the beam-splitting means should be a polarizing beamsplitter, such as a polarizing beamsplitter evanescent wave optical fiber coupler, and the various optical fibers in the system should be polarization maintaining (PM) fibers. In this case, the observation and reference beams can be brought into the same polarization by rotation of either the reference or detection optical fiber. Alternatively, a polarization rotation means, such as a Faraday rotator, can be coupled to either the reference or detection optical fiber, such that the reference and observation beams have substantially the same polarization when combined. Furthermore, the 50/50 fiber-optic coupler can be a polarization maintaining fiber coupler to optimally mix the polarized observation and reference beams.

An important advantage of the angled-dual-axis scanning confocal microscope of the present invention is that the illumination and observation beams remain intersecting optimally as the object is scanned, thereby providing enhanced axial resolution while maintaining a workable working distance. Such an arrangement takes advantage of the long working distance rendered by using low NA focusing elements (or lenses). Another important advantage gained by using low NA focusing elements is that the illumination and observation beams do not become overlapping until sufficiently close to the focus. This prevents scattered light in one beam from directly "jumping" to another beam, hence eliminating scattered photon noise in the observation beam. Furthermore, low NA lenses can be easily designed for aberration correction, thus allowing diffraction-limited performance at relatively low cost. In the present invention, diffraction-limited focusing is only required "on-axis", hence further simplifying the lens requirements. The angled-dual-axis confocal scanning microscope of the present invention further advantageously exploits the flexibility, scalability and integrity afforded by optical fibers and silicon fabrication technique, rendering it a highly versatile and modular device. Accordingly, the angled-dual-axis scanning confocal microscope of the present invention can be incorporated in the applications where a simple, flexible, low cost, and high resolution imaging device is desired.

By integrating the angled-dual-axis confocal scanning microscope of the present invention with fiber-optic components and a fiber-coupled laser, the angled-dual-axis confocal scanning systems of the present invention provide a diverse assembly of fiber-based, enhanced resolution, and high sensitivity systems that can be adapted in a variety of applications, such as in biological and medical imaging, and industrial applications.

The novel features of this invention, as well as the invention itself, will be best understood from the following drawings and detailed description.

DETAILED DESCRIPTION

Although the following detailed description contains many specific details for the purposes of illustration, anyone of ordinary skill in the art will appreciate that many variations and alterations to the following details are within the scope of the invention. Accordingly, the exemplary embodiment of the invention described below is set forth without any loss of generality to, and without imposing limitations upon, the claimed invention.

Figure 1A:
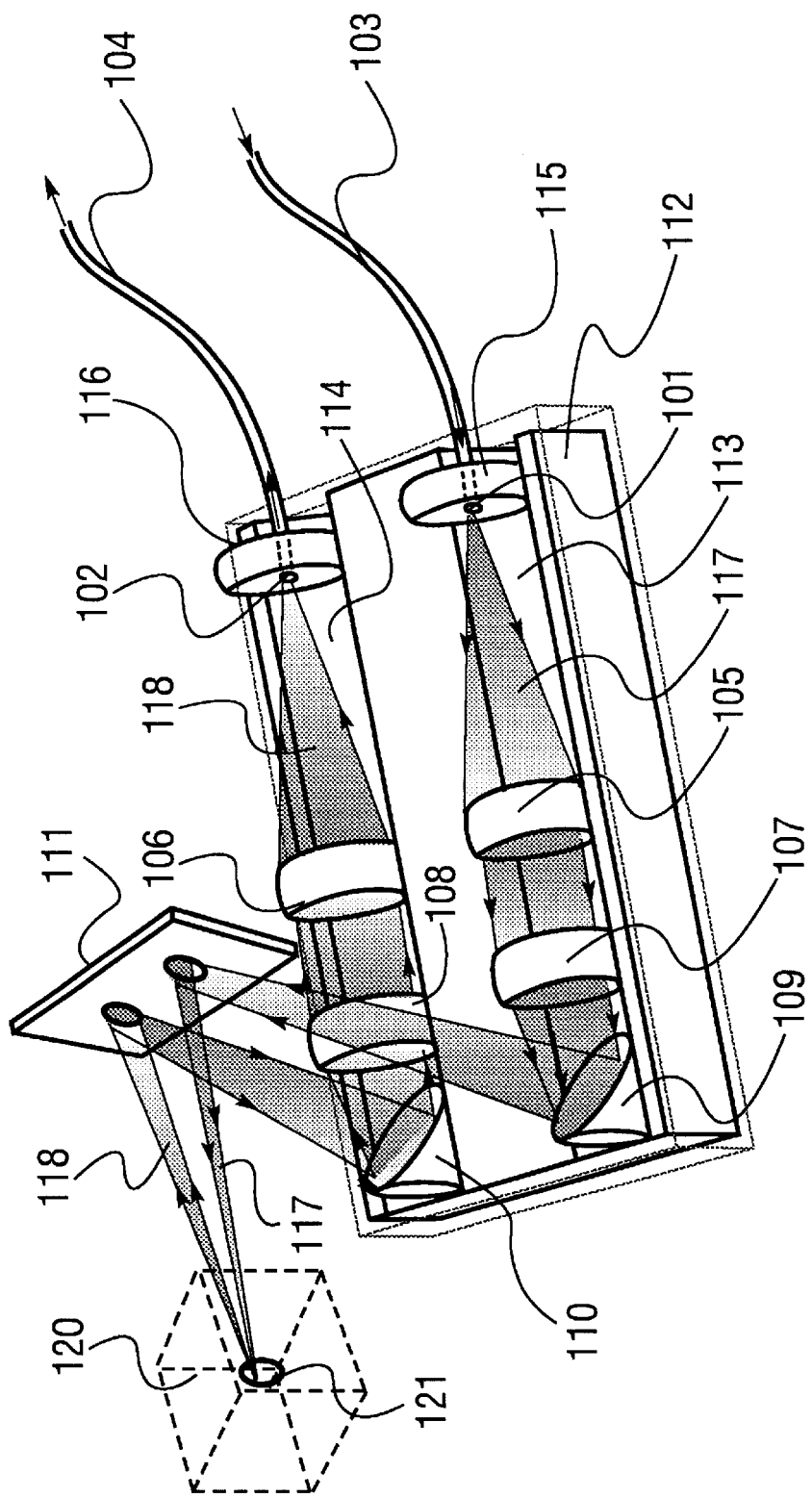
FIGS. 1A–1D shows several exemplary embodiments of an angle-dual-axis confocal head according to the present invention.

FIGS. 1A–1D depict several exemplary embodiments of an angle-dual-axis confocal head according to the present invention. Depicted in FIG. 1A is a first exemplary embodiment of an angled-dual-axis confocal head of the present invention. Angled-dual-axis confocal scanning head 100, by way of example, comprises a first end 101 of a first optical fiber 103 serving as a point light source; a first end 102 of a second optical fiber 104 serving as a point light detector; an angled-dual-axis focusing means in the form of an assembly of first collimating lens 105, second collimating lens 106, illumination lens 107, observation lens 108, and two beam-aligning elements in the form of first 45-degree mirror 109 and second 45-degree mirror 110, and a beam-deflecting mirror 111; and a silicon substrate 112. First collimating lens 105, illumination lens 107, and first mirror 109 are mounted on first V-groove 113 etched on substrate 112. Similarly, second collimating lens 106, observation lens 108, and second mirror 110 are mounted on second V-groove 114 etched on substrate 112. First optical fiber 103 and second optical fiber 104 are affixed to cylindrical ferrules 115 and 116 respectively, which are in turn mounted on V-grooves 113 and 114 respectively, such that fiber ends 101 and 102 are held in their respective positions.

In operation, an illumination beam 117 emerges from first end 101 of first optical fiber 103 and is directed to first collimating lens 105. The collimated beam is then passed onto and focused by illumination lens 107. The focused beam is further deflected by first mirror 109 to beam-deflecting mirror 111, which in turn directs the beam to a diffraction-limited illumination focal volume (see FIG. 1B) within an object 120. An observation beam 118 emanated from a diffraction-limited, confocal overlapping volume 121 is first collected by beam-deflecting mirror 111, and then deflected to second mirror 110, which in turn directs the beam to observation lens 108. Observation beam 118 is then collimated by observation lens 108 and further focused by second collimating lens 106 to first end 102 of second optical fiber 104. Beam-deflecting mirror 111 is positioned such that illumination beam 117 and observation beam 118 intersect optimally at an angle (θ) within confocal overlapping volume 121. A notable feature of angled-dual-axis confocal head 100 of the present invention is that the illumination and observation beam paths can be exchanged, without affecting its performance.

Figure 1B:
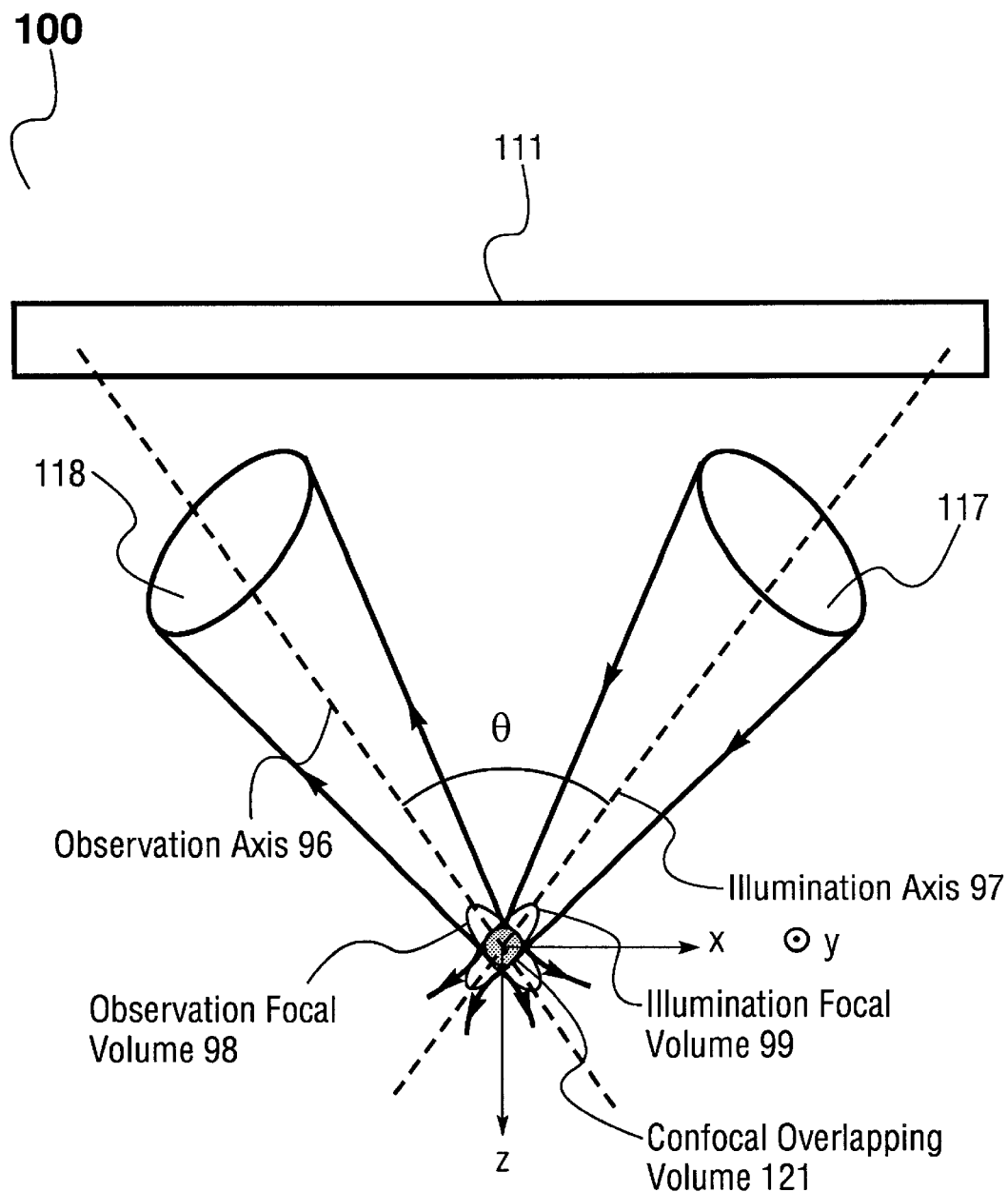

FIG. 1B provides a more detailed illustration of how illumination beam 117 and observation beam 118 are arranged to intersect within object 120 in FIG. 1A. Illumination beam 117, directed by beam-deflecting mirror 111, is focused to an illumination focal volume 99 oriented along an illumination axis 97 within object 120. Observation beam 118 emanates from an observation focal volume 98 oriented along an observation axis 96 within object 120 and is collected by beam-deflecting mirror 111. Illumination axis 97 and observation axis 96 are directed to intersect at angle θ, such that illumination focal volume 99 and observation focal volume 98 intersect optimally at confocal overlapping volume 121. A three-dimensional x-y-z coordinate system is provided to describe the spatial extents of confocal overlapping volume 121, where the origin of the coordinate system is set at the center of confocal overlapping volume 121. The z-axis defines the axial (or vertical) direction, whereas x-axis and y-axis (pointing out of the page) represent two orthogonal transverse directions.

It is to be understood that the term "emanating" as used in this specification is to be construed in a broad sense as covering any light transmitted back from the object, including reflected light, scattered light, or fluorescent light. A skilled artisan will know how to selectively make use of a particular type of light collected from the object and filter out spurious background light for a given application.

In the present invention, various optical elements are aberration-corrected, and single-mode optical fibers are used to provide point light source and detector. Accordingly, illumination focal volume 99 and observation focal volume 98 described above are diffraction-limited, defined by the main lobes of the illumination beam's point-spread function and observation beam's point-spread function. Confocal overlapping volume 121 is likewise diffraction-limited, determined by an optimal overlapping of the main lobes of the illumination beam's point-spread function and the illumination beam's point-spread function, as illustrated in FIG. 1B.

Ser. No. 09/628,118, incorporated herein by reference, discloses a mathematical model for calculating the point-spread functions of two optimally intersecting focused beams, such as illumination beam 117 and observation beam 118 exemplified in FIG. 1B, thereby providing an estimate of the three-dimensional extents of the resulting confocal overlapping volume, e.g., confocal overlapping volume 121. As the exemplary model calculations and accompanying graphs in Ser. No. 09/628,118 indicate, the confocal overlapping volume displays Gaussian-like characteristics in x, y, and z directions, diminishing rapidly and monotonically (i.e., there are no additional side-bands) with increasing distance from the center of the two-beam overlapping region. Such characteristics define a sharp resolution in both the axial as well as transverse directions. As a way of example, for an angled-dual-axis confocal system with an intersecting angle $\theta$ (=$2\alpha$) equal to 60° and NA of the objective lenses about 0.25, the corresponding axial resolution is approximately 2.8 microns, and the transverse resolutions about 1.6 and 1.4 microns, respectively.

Figure 1C:
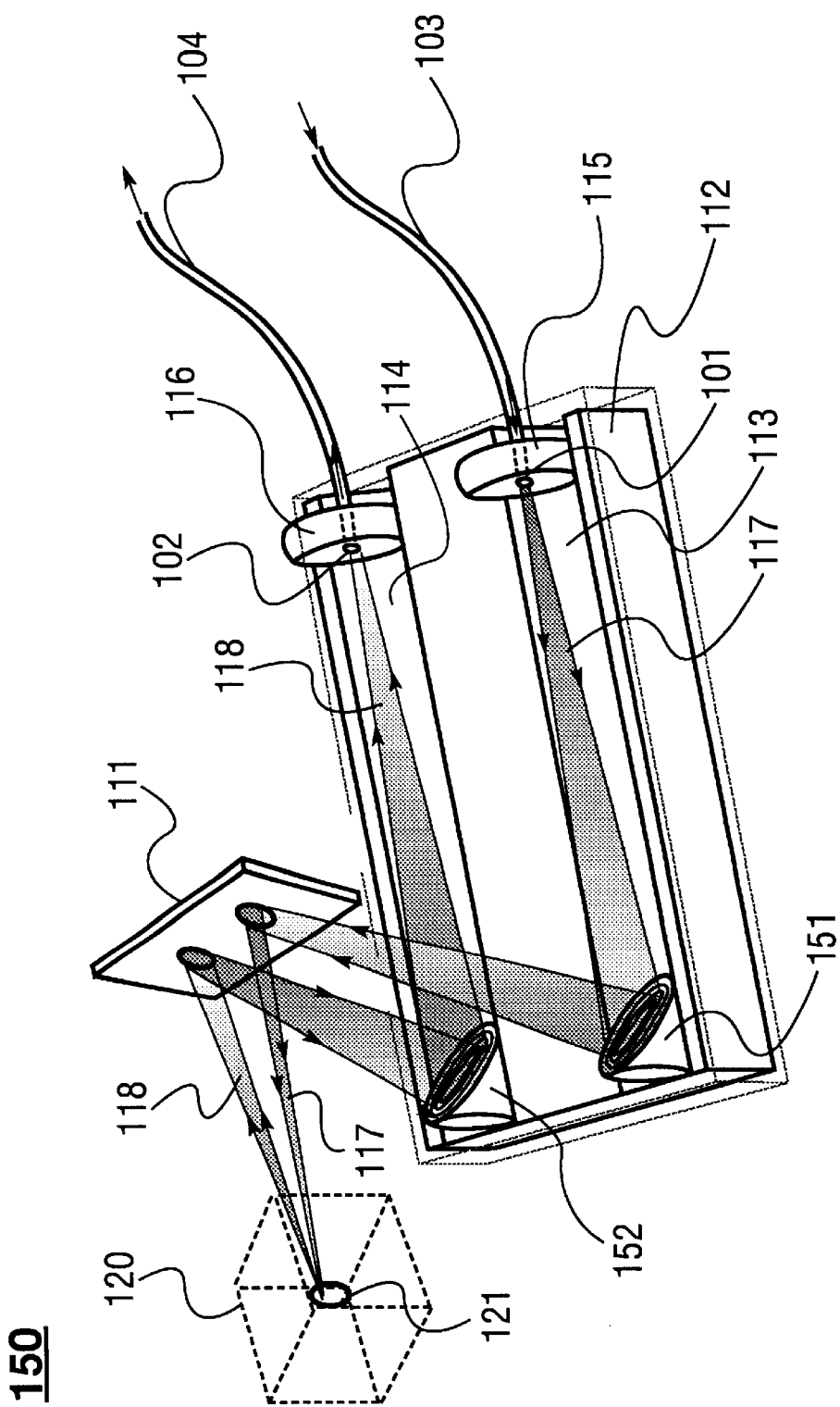

FIG. 1C shows a second exemplary embodiment of an angled-dual-axis confocal head of the present invention. In angled-dual-axis confocal head 150, an illumination reflective focusing element 151 is implemented to replace first collimating lens 105, illumination lens 107, and first mirror 109 in FIG. 1A, providing a dual function of focusing and aligning illumination beam 117. Likewise, an observation reflective focusing element 152 is used to replace second mirror 110, observation lens 108, and second collimating lens 106 in FIG. 1A, providing a dual function of focusing and aligning observation beam 118. The remainder of angled-dual-axis confocal scanning head 150 shares the same components with angled-dual-axis confocal scanning head 100 in FIG. 1A. By way of example, illumination and observation reflective focusing elements 151, 152 are in the form of two diffractive lenses with reflective coatings. The design of such reflective diffraction lenses can be provided by commercially available computer modeling programs and is well known in the art of diffractive lens design. Illumination and observation reflective focussing elements 151, 152 can alternatively be in the form of curved mirrors. In some cases of using curved mirrors such as ellipsoidal mirrors (each having two foci), it is desirable to place fiber ends 101, 102 at the respective first focal points of the two ellipsoidal mirrors serving as illumination and observation focusing elements 151, 152, thereby focusing illumination beam 117 and observation beam 118 at the respective second focal points of focusing elements 151, 152. All in all, the overall operation of angled-dual-axis confocal scanning head 150 is similar to the working of angled-dual-axis confocal scanning head 100, as described above.

Figure 1D:
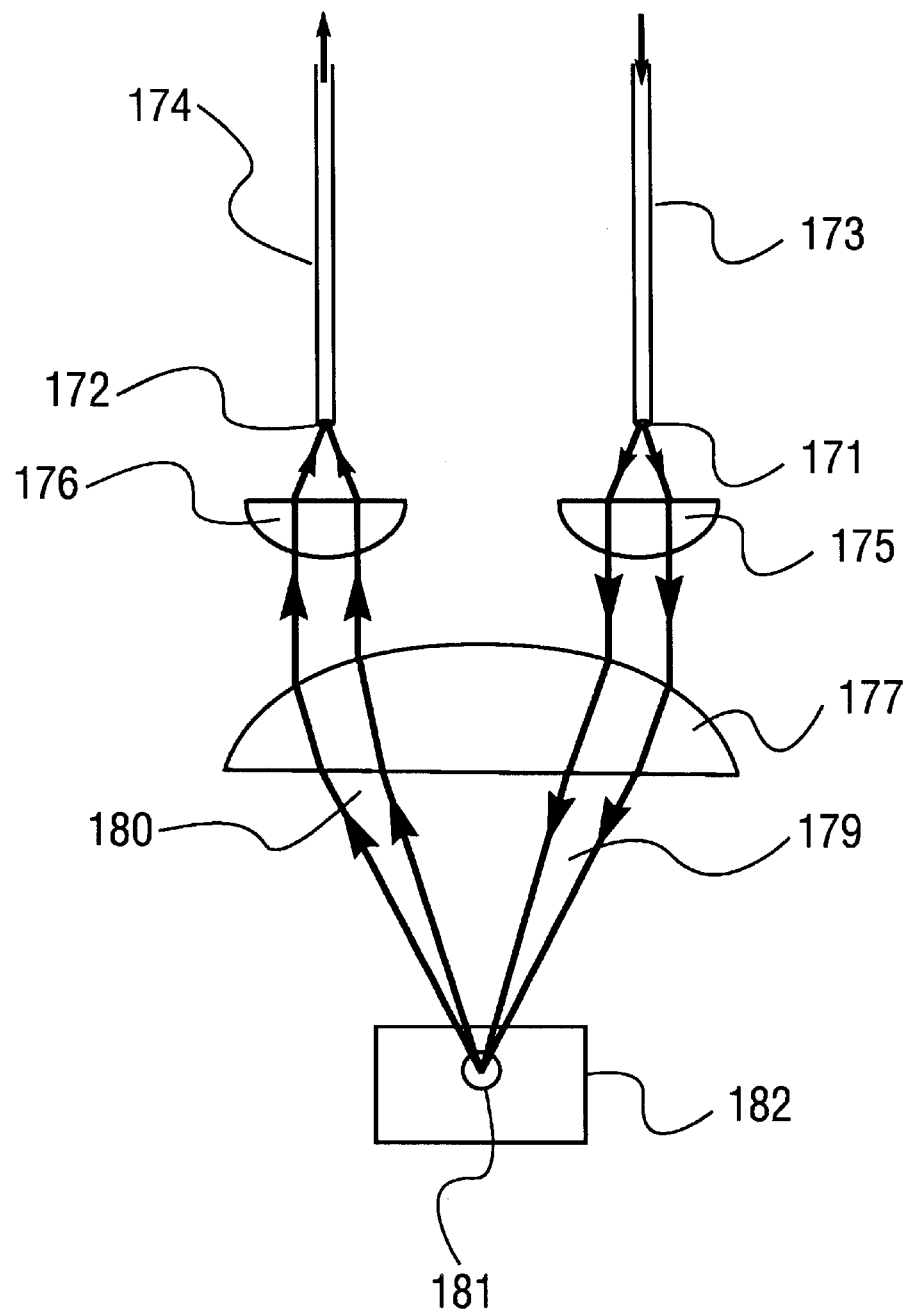

FIG. 1D depicts a simplified schematic illustration of a third exemplary embodiment of an angled-dual-axis confocal head of the present invention. Angled-dual-axis confocal head 170 comprises a first end 171 of a first optical fiber 173 serving as a point light source; a first end 172 of a second optical fiber 174 serving as a point light detector; and an angle-dual-axis focusing means in the form of an assembly of first collimating lens 175, second collimating lens 176, and illumination-observation lens 177.

In operation, an illumination beam 179 emerges from first end 171 of first optical fiber 173 and is directed to first collimating lens 175. The collimated beam is then passed onto and focused by illumination-observation lens 177 to a diffraction-limited illumination focal volume (not shown in FIG. 1D) within an object 182. An observation beam 180 emanated from a diffraction-limited, confocal overlapping volume 181 is first received and further collimated by illumination-observation lens 177. Observation beam 180 is then focused by second collimating lens 176 to first end 172 of second optical fiber 174. The design of illumination-observation lens 177 is such that illumination beam 179 and observation beam 180 intersect optimally at an angle ($\theta$) within confocal overlapping volume 181, as FIG. 1B illustrates. Those skilled in the art will recognize that the illumination and observation beam paths in angled-dual-axis confocal head 170 can be exchanged, without affecting its performance.

It should be noted that in an angled-dual-axis arrangement of the present invention, as the above exemplary embodiments depict, since the observation beam path is directed at an angle ($\theta$) relative to the illumination beam path, scattered light along the illumination beam does not easily get to be passed into the observation beam, except where the beams overlap. This significantly reduces scattered photon noise in the observation beam. Moreover, by using low NA (typically in the range of 0.1 to 0.4) focusing elements or lenses in an angled-dual-axis confocal system of the present invention, the illumination and observation beams do not become overlapping until very close to the focus. Such an arrangement further prevents scattered light in the illumination beam from directly "jumping" to the observation beam, hence further filtering out scattered photon noise in the observation beam. Altogether, the angled-dual-axis confocal system of the present invention has much lower noise and is capable of achieving higher sensitivity and larger dynamic range in detection, and consequently higher contrast particularly when imaging in a scattering medium, rendering it highly suitable for imaging within tissue or biological specimens.

FIGS. 1A, 1C–1D serve to illustrate only three of many embodiments of an angled-dual-axis confocal head of the present invention. In general, the angled-dual-axis focusing means in an angled-dual-axis confocal head of the present invention comprises an assembly of one or more elements for beam focusing, collimating, and deflecting, as exemplified in FIGS. 1A, 1C–1D. Such elements can be in the form of refractive lenses, diffractive lenses, GRIN lenses, focusing gratings, micro-lenses, holographic optical elements, binary lenses, curved mirrors, flat mirrors, prisms and the like. A crucial feature of the angled-dual-axis focusing means is that it provides an illumination axis and an observation axis that intersect at an angle, as illustrated in FIG. 1B. The optical fibers in an angled-dual-axis confocal head of the present invention can be single-mode fibers, multi-mode fibers, birefrigent fibers, polarization maintaining fibers and the like. Single-mode fibers are preferable, however, for the ends of single-mode fibers provide a nearly point-like light source and detector.

Moreover, the specific arrangements among various optical elements and optical fibers in an angled-dual-axis confocal head can be altered in many ways without deviating from the principle and the scope of the present invention. For instance, the use of collimating lenses and beam-aligning mirrors, such as those in FIG. 1A to help facilitate the shaping and aligning of the illumination and observation beams, can be optional and vary with the nature of practical applications. Other auxiliary optical elements may also be implemented in an angled-dual-axis confocal head of the present invention, to enhance the overall performance. Additionally, beam-deflecting mirror 111 in FIG. 1A or FIG. 1C can be split into two separate mirrors that are made to rotate about one or more axes, thereby each mirror pivoting the illumination and observation beams separately in such a way that their confocal overlapping volume scans through the object along a predetermined path. All in all, a skilled artisan can utilize the model calculation described in Ser. No. 09/628,118 to design an angled-dual-axis confocal head in accordance with the principle of the present invention, to best suit a given application.

By integrating its constituent optical elements on a silicon substrate, as exemplified in FIGS. 1A, 1C by way of silicon fabrication techniques, the angled-dual-axis confocal head of the present invention renders a high degree of integrity, maneuverability, scalability, and versatility. Such a design also provides greater flexibility and higher precision in the alignment of various optical elements. Although the particular way of making an angled-dual-axis confocal head of the present invention as an integrated device is dictated by the nature of a given application, a silicon substrate is generally preferred, for it is well known in the art that various V-grooves can be etched on silicon in a very precise manner, as demonstrated in U.S. Pat. Nos. 6,007,208 and 5,872,880. The precision of the V-grooves provides an accurate and secure optical alignment among various optical elements hosted by these V-grooves, enabling the angled-dual-axis confocal scanning head thus constructed to be a reliable and modular device. Using the embodiment of FIG. 1A as a way of example, mirrors 109, 110 can be rotated about their respective axes and translated along V-grooves 113, 114 respectively to facilitate the optimal intersection of illumination and observation beams 117, 118. Illumination and observation lenses 107, 108 can also be translated along V-grooves 113, 114 respectively, to further facilitate the optimal overlapping of illumination and observation focal volumes 99, 98 as illustrated in FIG. 1B. Such alignment procedures are performed before affixing (e.g., by means of gluing) various optical elements to their respective V-grooves. The scalability and relatively low cost of silicon fabrication technology add further advantages to this approach. For example, a micro-optic version of such an integrated confocal head can be incorporated in miniature surgical devices, endoscopes, or other in situ devices, suitable for medical applications.

Figure 2A:
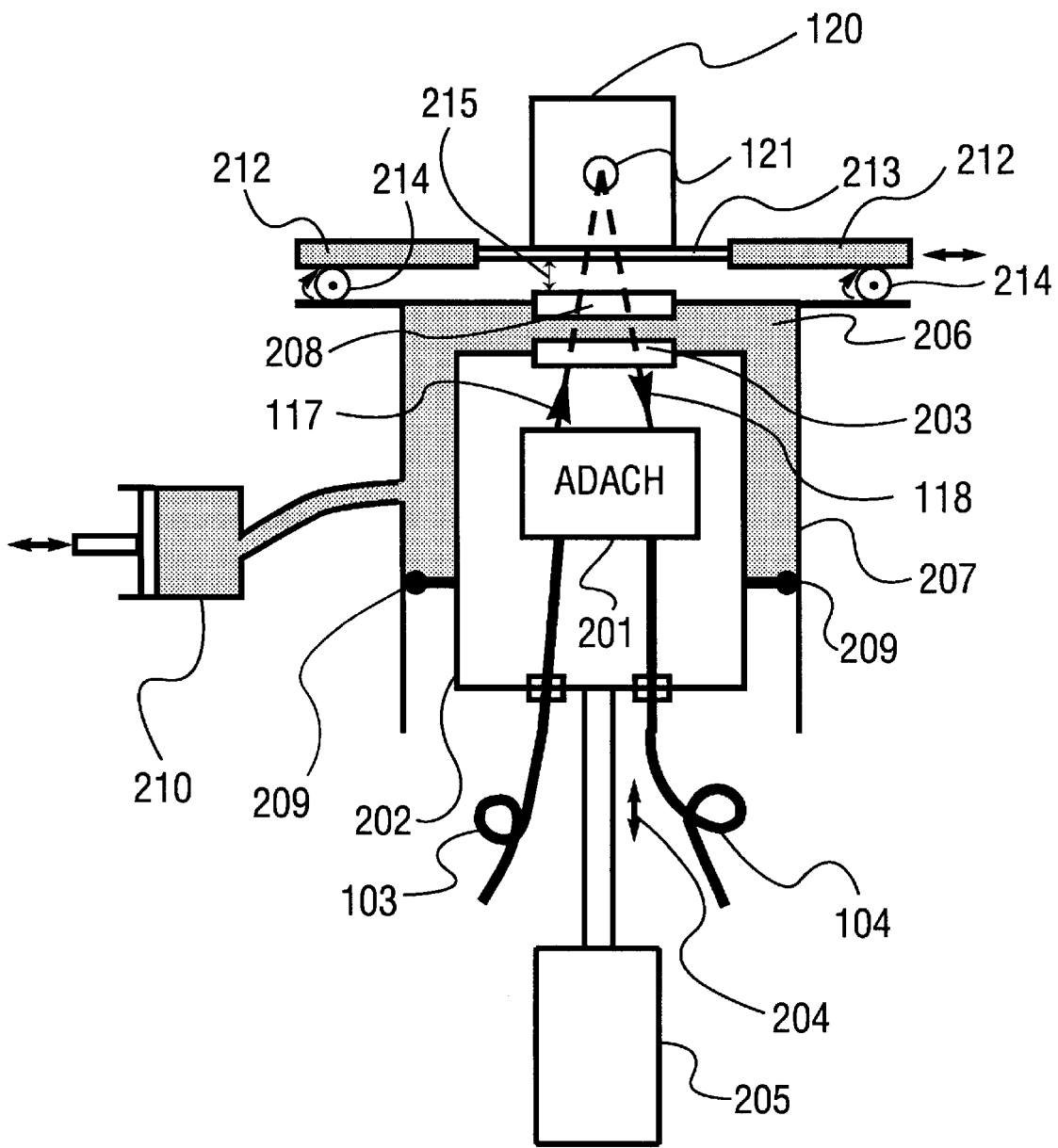
FIGS. 2A–2B depict two exemplary embodiments of an angle-dual-axis confocal scanning microscope according to the present invention.

To provide scanning in order to produce an image, an angle-dual-axis confocal head of the present invention can be mechanically coupled to a vertical scanning means and/or a transverse scanning means. The vertical scanning means may be in the form of a vertical scanning unit, comprising a vertical translation means and a compensation means. The vertical translation means causes the angled-dual-axis confocal head to move toward or away from the object and hence the illumination and observation beams to probe further into the interior of the object, thereby producing a vertical scan. The compensation means keeps the optical paths lengths of the illumination and observation beams substantially unchanged, thereby ensuring the optimal intersection of the illumination and observation focal volumes in the course of vertical scanning. This compensation function is also crucial for performing optical coherence microscopy. The transverse scanning means may be in the form of a transverse stage, causing the object to move relative to the angled-dual-axis confocal head along transverse directions, thereby providing a transverse scan. An angled-dual-axis confocal head incorporating vertical and transverse scanning means thus described constitutes a first embodiment of an angled-dual-axis confocal scanning microscope of the present invention, as depicted in FIG. 2A. Angled-dual-axis confocal scanning microscope 200, by way of example, comprises an angled-dual-axis confocal head (ADACH) 201 and a vertical translation means in the form of a movable carriage 202. For the purpose of illustration, angled-dual-axis confocal scanning head 201 is in a simplified schematic form of the embodiment shown in FIG. 1A (or FIG. 1C), although any other embodiments according to the present invention can be equivalently utilized. In the embodiment of FIG. 2A, angled-dual-axis confocal head 201 is attached to and further enclosed in movable carriage 202, with first and second optical fibers 103, 104 extending to the outside of movable carriage 202. A first transparent window 203 is mounted on movable carriage 202 for passage of illumination beam 117 and observation beam 118. Driven by a motor 205, movable carriage 202 can move up and down along a vertical (or axial) direction as defined by arrow 204, causing angle-dual-axis confocal head 201 to move toward or away from object 120 in the process. By doing so, confocal overlapping volume 121 of illumination beam 117 and observation beam 118 deepens into (or retracts from) the interior of object 120, thereby producing a vertical scan. Motor 205 can be actuated by a variety of means, such as magnetic, hydraulic, piezoelectric, and other actuators. A skilled artisan can accordingly devise a movable carriage mechanically driven by a motor suitable for a given application.

As illumination beam 117 and observation beam 118 deepen into the interior of object 120 in the course of vertical scanning, the change in their respective optical path lengths becomes increasingly large, which may cause their respective focal volumes to no longer intersect in an optimal manner, or even not to intersect at all at the point where the two beams physically meet. Furthermore, in interferometry applications such as optical coherence microscopy, the optical path lengths of illumination beam 117 and observation beam 118 must stay substantially fixed in order to sustain coherent interference. To maintain the optical path lengths of illumination beam 117 and observation beam 118 during vertical scanning, movable carriage 202, along with angled-dual-axis confocal head 201, is disposed within a container 207 filled with a substantially transparent fluid 206 having an index of refraction that is substantially the same as the index of refraction of object 120, such that the optical path lengths of illumination beam 117 and observation beam 118 remain substantially unchanged in the course of vertical scanning. The use of optical fibers further provides the necessary flexibility that enables the whole assembly of angled-dual-axis confocal head 201 and movable carriage 202 to move up and down without incurring additional changes in the optical path lengths of illumination beam 117 and observation beam 118. An O-ring seal 209 is provided to seal the fluid inside container 207, while still permitting movable carriage 202 to move up and down relative to container 207. A second transparent window 208 is mounted on container 207, such that it is in optical communication with first transparent window 203 for passage of illumination and observation beams 117, 118. Container 207 is further connected to a fluid injection system 210, serving as a reservoir for replenishing additional fluid or receiving excess fluid as movable carriage 202 is moving towards or away from object 120. For imaging of human tissue and other biological samples, fluid 206 can be water, which has an index of refraction closely matching that of tissue and biological samples.

Angled-dual-axis confocal scanning microscope 200 further comprises a transverse scanning means in the form of a transverse stage 212. A third transparent window 213, in optical communication with second transparent window 208, is mounted on transverse stage 212 for passage of illumination and observation beams 117, 118. Object 120 is in turn placed on third transparent window 213. Transverse stage 212 is further mechanically coupled to two or more ball bearings (or wheels) 214, which enable transverse stage 212 along with object 120 to move relative to angled-dual-axis confocal head 201 along transverse directions perpendicular to the vertical direction 204, thereby producing a transverse scan. Ball bearings 214 also serve to keep the distance 215 between second transparent window 208 and third transparent window 213 constant, so as to preserve the optical path lengths of illumination and observation beams 117, 118 in the course of scanning.

It should be noted that certain aberrations of the illumination and observation beams may occur as a result of successive passages of the beams through first, second and third transparent windows 203, 208, 213, fluid 206, and object 120 in the above embodiment, which may require specific designs of the illumination and observation focusing elements that are corrected for these aberrations. Alternatively, auxiliary optical elements that are properly designed for correcting such aberrations may be implemented in the angle-dual-axis focusing means. In most cases of a converging beam passing through a window or into another object at an inclined angle, the primary aberrations to be corrected for will be spherical aberration, astigmatism, and coma. The magnitude of these aberrations depend upon many factors, and typically increases with NA of the focusing elements, the index of refraction and the thickness of the window, and the angle of incidence. The design of such aberration-corrected focusing elements, or the auxiliary optical elements for correcting aberrations, can be accomplished by a lens designer of ordinary skill and with the help of an optical design computer program such as Zemax™.

In applications where NA of the focusing elements are sufficiently low and the thicknesses of windows, fluid and object through which the illumination and observation beams successively traverse are not large, the aberrations would be small and may not need to be corrected. In such cases, the embodiment shown in FIG. 2A can be utilized, which may incorporate additional remedies for further minimizing aberrations. Such remedies include, for example, using windows made of Teflon AF™ or other materials that are transparent and have an index of refraction closely matching that of water.

Figure 2B:
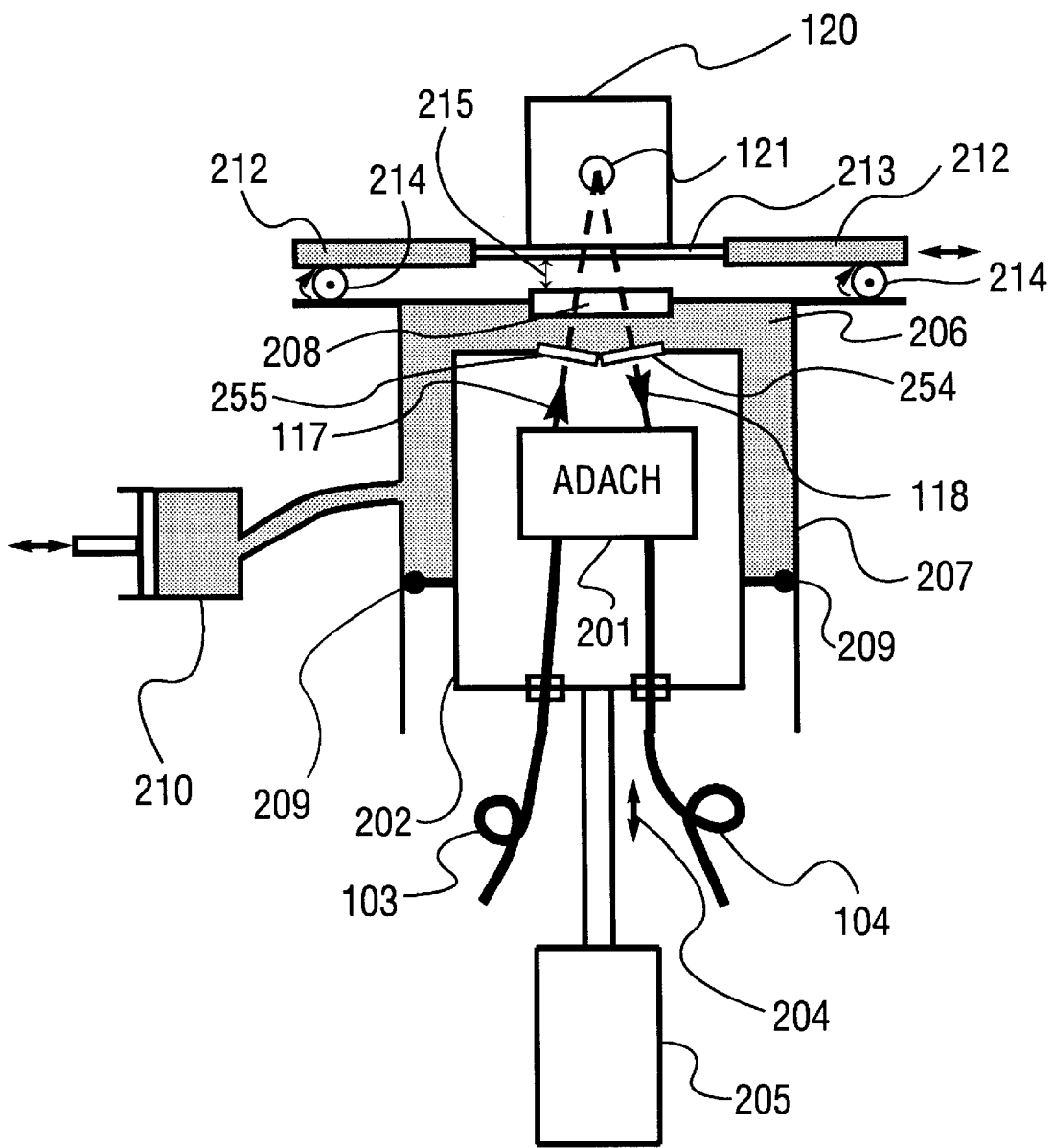

FIG. 2B depicts a second embodiment of an angled-dual-axis confocal scanning microscope of the present invention, pertaining to applications where the aforementioned aberrations may not be negligible. In angled-dual-axis confocal scanning microscope 250, a window assembly comprising two flat transparent windows 254, 255 in an angled arrangement is implemented to replace single flat window 203 in FIG. 2A. The remainder of angled-dual-axis confocal scanning microscope 250 share the same components as angled-dual-axis confocal scanning microscope 200 shown in FIG. 2A. The window assembly is designed such that illumination axis 97 and observation axis 96 (illustrated in FIG. 1B) are substantially perpendicular to flat windows 255, 254, respectively. As such, the window assembly can greatly reduce coma and astigmatism that would otherwise be associated with using a single flat window (such as window 203 in FIG. 2A). Moreover, distance 215 can be made very small, and second and third windows 208, 213 can be made of Teflon AF™, to further decrease coma and astigmatism. To further reduce these aberrations, a space between second and third windows 208, 213 can be filled with a fluid, which has an index of refraction substantially close to that of fluid 206. Although spherical aberrations still need to be corrected for in this case, the techniques for making such corrections are well known in the art of lens design. For instance, a skilled artisan can make use of the design of microscope objectives that are corrected for glass coverslips of a certain thickness to accomplish this task. with a fluid, which has an index of refraction substantially close to that of fluid 206. Although spherical aberrations still need to be corrected for in this case, the techniques for making such corrections are well known in the art of lens design. For instance, a skilled artisan can make use of the design of microscope objectives that are corrected for glass coverslips of a certain thickness to accomplish this task.

As such, angled-dual-axis confocal scanning microscope 200 or 250 of the present invention is capable of providing transverse and vertical scans in various ways. For example, it can produce a line scan along the vertical direction 204, termed a vertical-line scan hereinafter; a vertical cross-section scan comprising a plurality of vertical-line scans that are assembled along a transverse direction perpendicular to the vertical direction 204; a line scan along a transverse direction perpendicular to the vertical direction 204, termed a transverse-line scan hereinafter; and a transverse cross-section scan comprising a plurality of transverse-line scans assembled along a transverse plane perpendicular to the vertical direction 204; and so on. Furthermore, by assembling a plurality of transverse cross-section scans that progressively deepen into the object, by assembling a plurality of vertical cross-section scans that move incrementally in a transverse direction (perpendicular to each vertical cross-section scan), or by assembling an assortment of transverse-line scans along different transverse directions and vertical-line scans, a three-dimensional volume image of the object can be constructed.

All in all, angled-dual-axis confocal scanning microscope 200 or 250 of the present invention provides a simple, versatile, and high resolution imaging tool, well suited for examining tissue and other biological specimens.

For tissue imaging applications, the wavelength of light generally ranges from about 0.8 microns to 1.6 microns, since biological tissue samples are particularly transparent in this range. Embodiments of the angled-dual-axis confocal scanning microscope of the present invention are capable of achieving a resolution of about 1–5 microns in the axial (e.g., the vertical direction shown in FIGS. 2A–2B) as well as the transverse directions, by use of illumination and observation lenses with NA typically ranging from 0.1 to 0.4, and the intersecting angle θ typically ranging from 45° to 90°. The vertical and transverse cross-section scan areas can be typically on the order of about 0.5–3 millimeters in each direction. The vertical and transverse scanning can be typically performed at rates ranging from 0.1 Hz to 100 Hz.

The specific numbers provided above are designed for tissue imaging, to illustrate the utility and the performance of the present invention as a way of example. A skilled artisan can utilize the model calculation provided in Ser. No. 09/628,118 to design an angled-dual axis confocal scanning microscope in accordance with the present invention, for a given application.

Figure 3A:
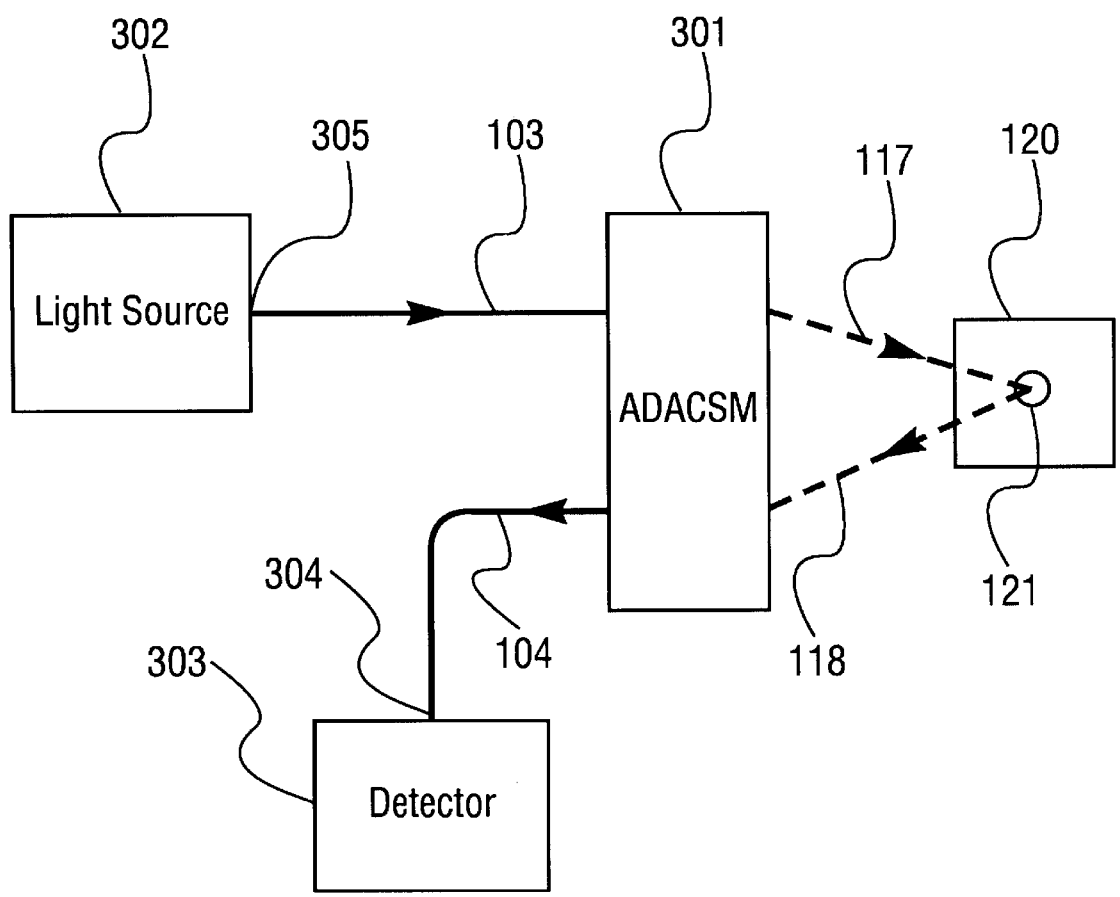
FIGS. 3A–3B show two exemplary embodiments of a first angle-dual-axis confocal scanning system according to the present invention.

FIG. 3A depicts an exemplary embodiment of a first angle-dual-axis confocal scanning system of the present invention. Angled-dual-axis confocal scanning system 300 comprises an angled-dual-axis confocal scanning microscope (ADACSM) 301, a light source 302, and an optical detector 303. By way of example, angled-dual-axis confocal scanning microscope 301 is in a simplified schematic form of one of the embodiments shown in FIGS. 2A–2B. Any other embodiment in accordance with the present invention can be alternatively implemented. Light source 302 is optically coupled to a second end 305 of first optical fiber 103, to provide an illumination beam to angle-dual-axis confocal scanning microscope 301. Optical detector 303 is optically coupled to a second end 304 of second optical fiber 104, to receive an observation beam collected by angle-dual-axis confocal scanning microscope 301 from confocal overlapping volume 121 within object 120. Light source 302 can be a fiber laser, a semiconductor optical amplifier, an optical fiber amplifier, a semiconductor laser, a diode-pumped solid state laser, or any other fiber-coupled light source known in the art. The wavelength of light provided by light source 302 is typically in the range of 0.8–1.6 microns, with an average power of about 20 to 200 milliwatts. Light source 302 may operate in a continuous wave (CW) or pulsed mode. Optical detector 303 can be a PIN diode, or an avalanche photo diode (APD), for instance. In some cases where the observation beam is weak, a photomultiplier tube detector may be used. A skilled artisan will know how to select a proper optical detector for a given application, as described in "Building Electro-Optical Systems, Making it all work" by Philip C. D. Hobbs, John Wiley & Sons, 2000. By utilizing methods well known in the art, the resulting signals from optical detector 303 can be electronically processed and assembled into images corresponding to scanned regions of object 120. As such, angled-dual-axis confocal scanning system 300 provides a versatile and high-resolution imaging device, and can be readily employed in a variety of applications. Those skilled in the art can implement this angled-dual-axis confocal scanning system of the present invention in a way suitable for a given application.

Figure 3B:
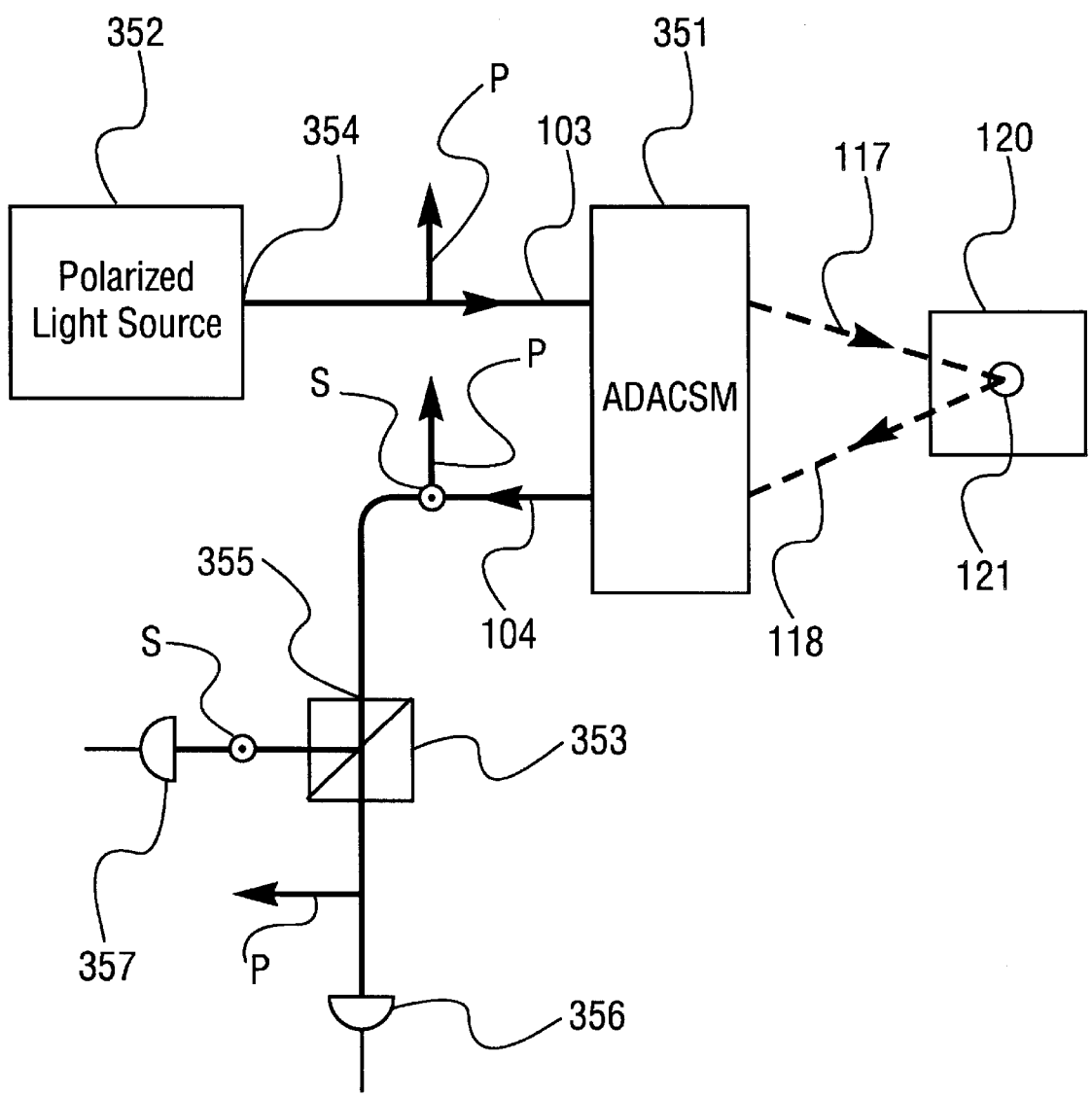

The embodiment described above can also be used to provide specific information pertaining to the polarization state of light emanated from a polarization-altering, e.g., a birefrigent-scattering, medium. Many biological tissues, such as tendons, muscle, nerve, bone, cartilage and teeth, exhibit birefrigence due to their linear or fibrous structure. Birefrigence causes the polarization state of light to be altered (e.g., rotated) in a prescribed manner upon refection. Skin is another birefrigent medium. Collagen contained in skin is a weakly birefrigent material. At temperatures between 56–65° C., collagen denatures and loses its birefrigence. Thus, by detecting induced changes in the polarization state of light reflected from a skin sample, an image representing the regions of skin where thermal injury occurs can be identified. FIG. 3B shows an alternative embodiment of the first angled-dual-axis confocal scanning system of the present invention, pertaining to applications where polarized light is used to probe a birefrigent-scattering (or other polarization-altering) medium. By way of example, angled-dual-axis confocal scanning system 350 comprises an angled-dual-axis confocal scanning microscope (ADACSM) 351, a polarized light source 352, and a polarizing beamsplitter 353. As in FIG. 3A, angled-dual-axis confocal scanning microscope 351 is in a simplified schematic form of one of the embodiments shown in FIGS. 2A–2B, with first and second optical fibers 103, 104 being polarization maintaining fibers capable of supporting two orthogonal polarizations. Polarized light source 352 is optically coupled to a second end 354 of first optical fiber 103, to provide an illumination beam 117 with P-polarization to angled-dual-axis confocal scanning microscope 351. Polarizing beamsplitter 353 is optically coupled to a second end 355 of second optical fiber 104, to receive an observation beam 118 with orthogonal P-polarization and S-polarization collected by angled-dual-axis confocal scanning microscope 351 from confocal overlapping volume 121 within a birefrigent-scattering (or other polarization-altering) object 120. The birefrigent (or other polarization-altering) "scatterers" in object 120 emanate light whose polarization is altered (e.g., rotated) with respect to the polarization of the illumination beam. Such a rotated polarization can be represented in two orthogonal components, e.g., P-polarization and S-polarization. Polarizing beamsplitter 353 separates P-polarization and S-polarization by routing them to two separate optical detectors 356, 357 respectively, such that an image representing these birefrigent (or other polarization-altering) scatterers can be obtained.

In the embodiment of FIG. 3B, polarized light source 352 can be a laser source, such as a semiconductor optical amplifier, an optical fiber amplifier, a semiconductor laser, a diode-pumped solid state laser, or any other fiber-coupled polarized light source known in the art. Polarized light source 352 can also be an assembly consisting of an unpolarized light source optically coupled to a polarizer, such that polarized light is produced and transmitted from the assembly to angled-dual-axis confocal scanning microscope 351 as an illumination beam. Optical detectors 356, 357 can be PIN diodes, avalanche photo diodes, or photomultiplier tubes. Polarizing beamsplitter 353 can be a polarizing beamsplitter evanescent wave optical fiber coupler, for instance. As such, angled-dual-axis confocal scanning system 350 is suited for applications in which high resolution imaging of birefrigent (or other polarization-altering) media is required. Those skilled in the art can implement this angled-dual-axis confocal scanning system of the present invention in a way suitable for a given application.

It should be pointed out that although optical fibers, particularly single-mode fibers, are preferable as optical coupling means between various optical elements in this invention, and are used throughout this specification wherever optical coupling is called for, other suitable optical coupling means can be alternatively implemented in various angled-dual-axis confocal scanning systems of this invention, without deviating from the principle and the scope of the present invention.

Figure 4:
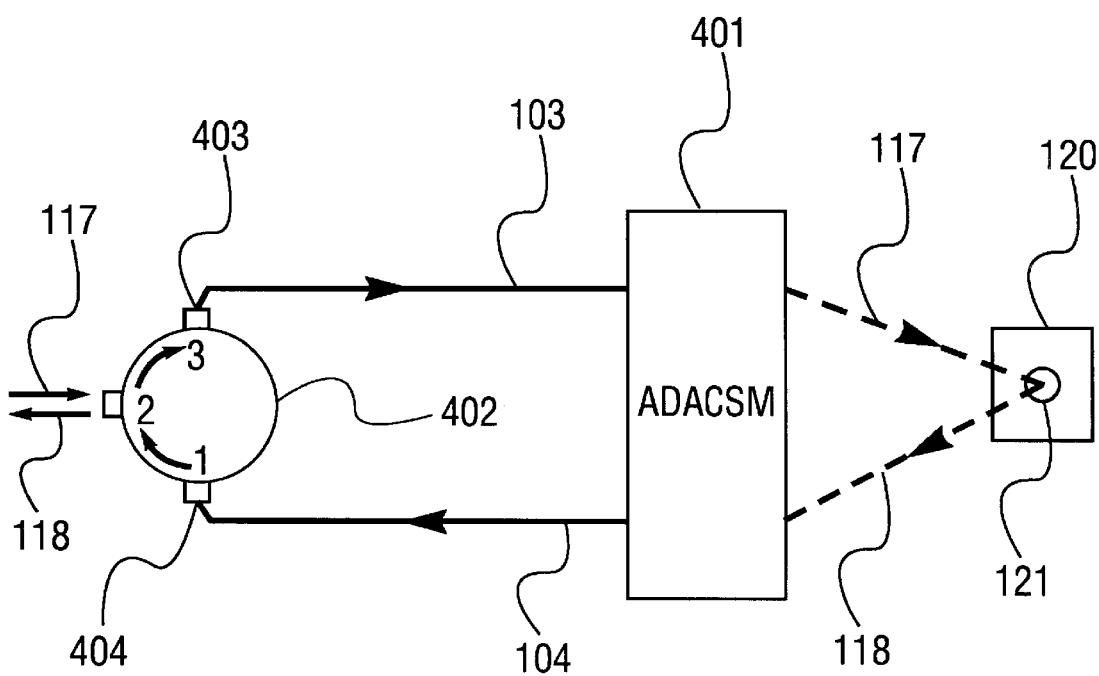
FIG. 4 depicts an exemplary embodiment of an angled-dual-axis confocal scanning module according to the present invention.

FIG. 4 depicts an exemplary embodiment of an angled-dual-axis confocal scanning module according to the present invention. Angled-dual-axis confocal scanning module 400 comprises an angled-dual-axis confocal scanning microscope (ADACSM) 401 and a three-port optical circulator 402. For the purpose of illustration, angled-dual-axis confocal scanning microscope 401 is in a simplified schematic form of one of the embodiments shown in FIGS. 2A–2B, although any other embodiments in accordance with the present invention can also be used. Three-port optical circulator 402 is a non-reciprocal device, which couples light incident on port-1 to port-2, and light incident on port-2 to port-3 with high transmission. Whereas light traveling in a reversed order encounters high isolation. High isolation also exists between port-1 and port-3. For instance, current commercial fiber-coupled circulators known in the art have insertion losses (port-1 to 2, and port-2 to 3) less than 0.7 dB, and isolation (port-3 to 2, port-2 to 1) greater than 50 dB. Angled-dual-axis confocal scanning module 400 is configured such that port-3 of optical circulator 402 is optically coupled to a second end 403 of first optical fiber 103; port-1 of optical circulator 402 is optically coupled to a second end 404 of second optical fiber 104; and port-2 serves as a bi-directional input/output port. In operation, an illumination beam 117 transmitted to port-2 is passed into port-2 of optical circulator 402 and then coupled to fiber end 403 of angled-dual-axis confocal scanning microscope 401 in nearly its entirety; and an observation beam 118 collected by angle-dual-axis confocal scanning microscope 401 from confocal 30 overlapping volume 121 within object 120 is delivered to port-1 via fiber end 404 and then routed to port-2 of optical circulator 402, to be further utilized or detected in nearly its entirety. As such, angled-dual-axis confocal scanning module 400 of the present invention provides a modular, power-efficient, angled-dual-axis confocal scanning device with a single input/output port, and can be readily incorporated in many optical systems, as the following exemplary embodiments illustrate.

Figure 5A:
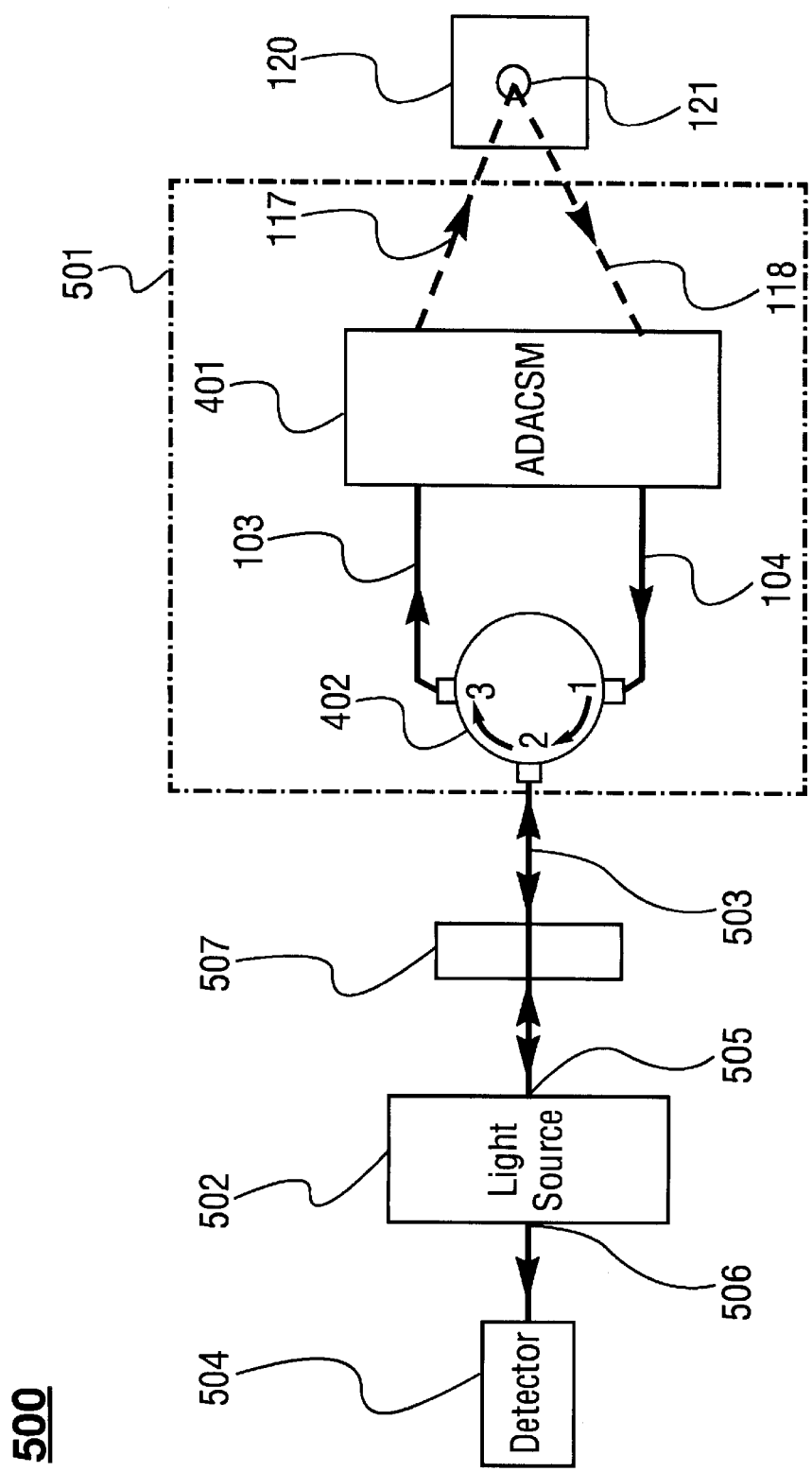
FIGS. 5A–5B show simplified schematic diagrams of second and third angled-dual-axis confocal scanning systems according to the present invention.
Figure 5B:
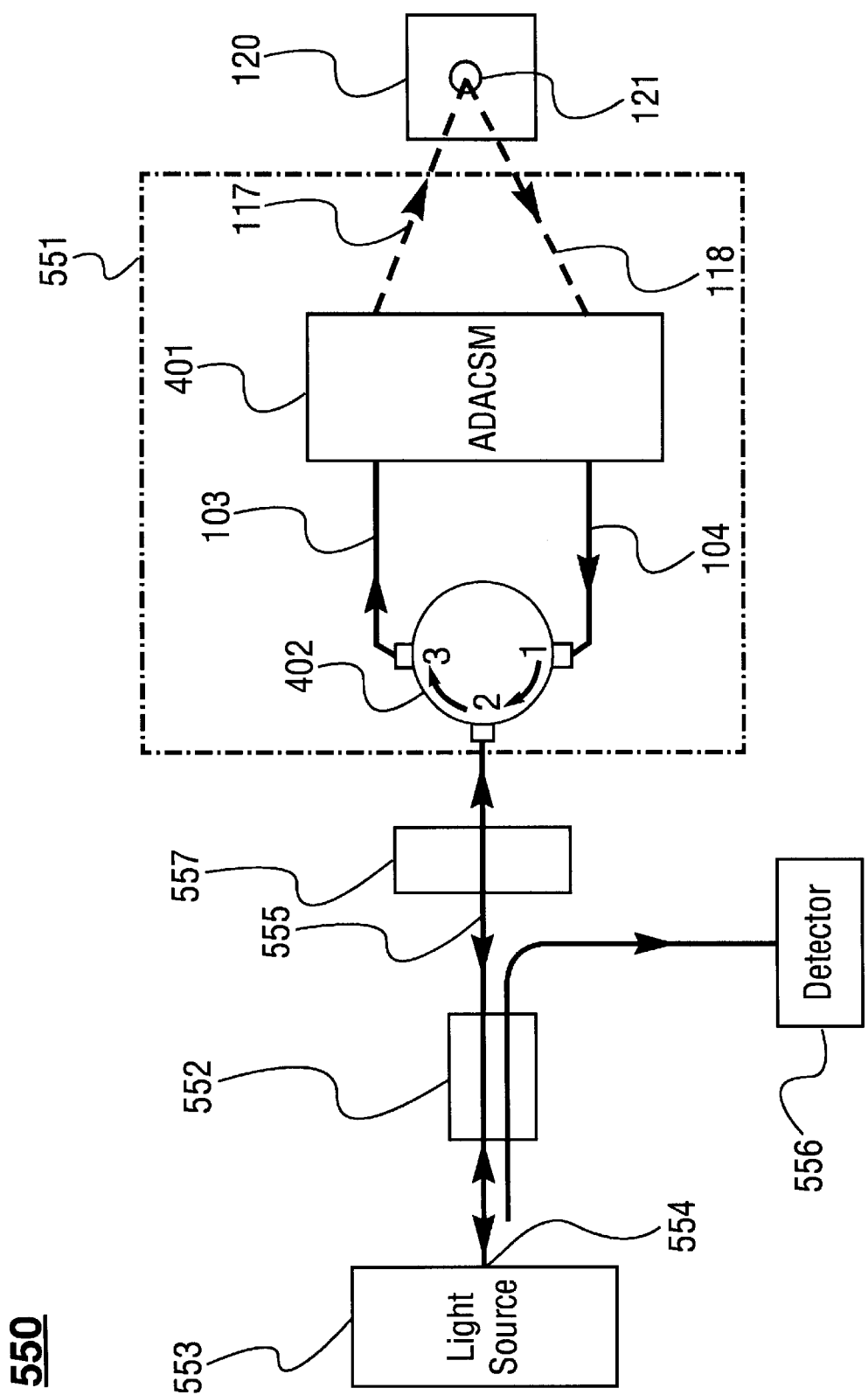

FIGS. 5A–5B show simplified schematic diagrams of second and third angled-dual-axis confocal scanning systems incorporating an angled-dual-axis confocal scanning module of the present invention. Depicted In FIG. 5A is the second angled-dual-axis confocal scanning system 500, comprising an angled-dual-axis confocal scanning module 501, a self-detecting laser source 502, a third optical fiber 503, and an optical detector 504. By way of example, angled-dual-axis confocal scanning module 501 is in the form of the embodiment shown in FIG. 4, although any other embodiment in accordance with the present invention can be alternatively implemented. Laser source 502 is equipped with first output aperture 505 and second output aperture 506. Third optical fiber 503 is optically coupled to first output aperture 505 of laser source 502 on one end and to port-2 of angled-dual-axis confocal scanning module 501 on the other, such that an illumination beam 117 emitted from first output aperture 505 of laser source 502 is transmitted to angled-dual-axis confocal scanning microscope module 501 through port-2, and an observation beam 118 collected by angled-dual-axis confocal scanning module 501 from confocal overlapping volume 121 within object 120 is in turn back coupled to laser source 502 again via first output aperture 505. The feedback into laser source 502 of observation beam 118 emanated from object 120 alters the intensity as well as the modes supported by the laser cavity, and the resulting changes are detected by optical detector 504 optically coupled to second output aperture 506 of laser source 502. The presence of non-reciprocal optical circulator 402 in angle-dual-axis confocal scanning module 501 enables nearly 100% of illumination beam 117 from laser source 502 to be delivered to angled-dual-axis confocal scanning microscope 401, as well as nearly 100% of observation beam 118 collected by angled-dual-axis confocal scanning microscope 401 to be back coupled to laser source 502, hence maximizing the signal-to-noise ratio in detection. The use of self-detecting laser source 502, both as a light source and as a detector, further simplifies the structure of this angled-dual-axis confocal scanning system.

The self-detecting characteristics of lasers have been advantageously exploited in the art to provide an integrated light source and detector, as demonstrated in U.S. Pat. Nos. 5,887,009 and 5,563,710, by R. Juskaitis et al. in "Semiconductor Laser Confocal Microscopy", Applied Optics, 33 (4), pp.578 (1994), and by R. Juskaitis et al. in "Compact confocal interference microscopy", Optics Communications, 109, pp.167 (1994), all incorporated herein by reference. A great deal of effort has also been devoted to eliminate such feedback effects; in fact, optical isolators with non-reciprocal optical elements such as Faraday rotators are designed to eliminate or block the back-coupling of light. The effects of laser feedback and the resulting perturbations of laser power and frequency depend on many conditions including laser cavity parameters, and a complete theory is still lacking at the present time. In the present invention, the self-detecting laser source can be a fiber laser, a semiconductor laser, or a diode pumped solid state laser. A fiber-based laser system, such as the fiber laser disclosed by the inventors of this application in U.S. Pat. No. 5,887,009, may be used to take advantage of a wide range of possible designs and laser cavity parameters to optimize the laser self-detecting properties. A semiconductor laser may also be desirable for constructing a low cost device.

Angled-dual-axis confocal scanning system 500 in FIG. 5A further comprises a frequency shifting means (or a phase modulator) in the form of frequency shifter 507 optically coupled to third optical fiber 503, such that the frequency of observation beam 118 is shifted before being back coupled to laser source 502. Frequency shifter 507 can be alternatively coupled to first optical fiber 103, or second optical fiber 104, for the same purpose of shifting the frequency of observation beam 118. The feedback of the frequency-shifted (or phase-modulated) observation beam to laser source 502 results in the laser's output beam being modulated at a beat frequency, thus allowing more sensitive heterodyne detection.

FIG. 5B depicts the third angled-dual-axis confocal scanning system of the present invention, pertaining to the situation where the self-detecting laser is equipped with only one output aperture. Angled-dual-axis confocal scanning system 550 comprises an angled-dual-axis confocal scanning module 551, a beam-splitting means in the form of a fiber-optic coupler 552, a self-detecting laser source 553 having a single output aperture 554. By way of example, angled-dual-axis confocal scanning module 551 is in the form of the embodiment shown in FIG. 4, although any other embodiment in accordance with the present invention can also be implemented. Angled-dual-axis confocal scanning module 551 is optically coupled to fiber-optic coupler 552 by way of a third optical fiber 555, and fiber-optic coupler 552 is in turn optically coupled to laser source 553. Fiber-optic coupler 552 directs a portion of an output beam emitted from output aperture 554 of laser source 553 to port-2 of angled-dual-axis confocal scanning module 551, providing an illumination beam 117. An observation beam 118 collected by confocal scanning module 551 from confocal overlapping volume 121 within object 120 is routed back to laser source 553 again via output aperture 554. Fiber-optic coupler 552 also routes a remainder of the laser's output beam, which carries the perturbations due to the back coupling of observation beam 118, to an optical detector 556.

To enhance the back coupling effects, a low-coupling tap coupler, such as a 90/10 fiber-optic coupler, is preferred. To make use of heterodyne detection, a frequency shifting means (or a phase modulator) in the form of frequency shifter 557 is optically coupled to third optical fiber 555, such that the frequency of observation beam 118 is shifted before being back coupled to laser source 553. Frequency shifter 557 can be alternatively coupled to first optical fiber 103, or second optical fiber 104, for the purpose of shifting the frequency of observation beam 118.

Figure 6A:
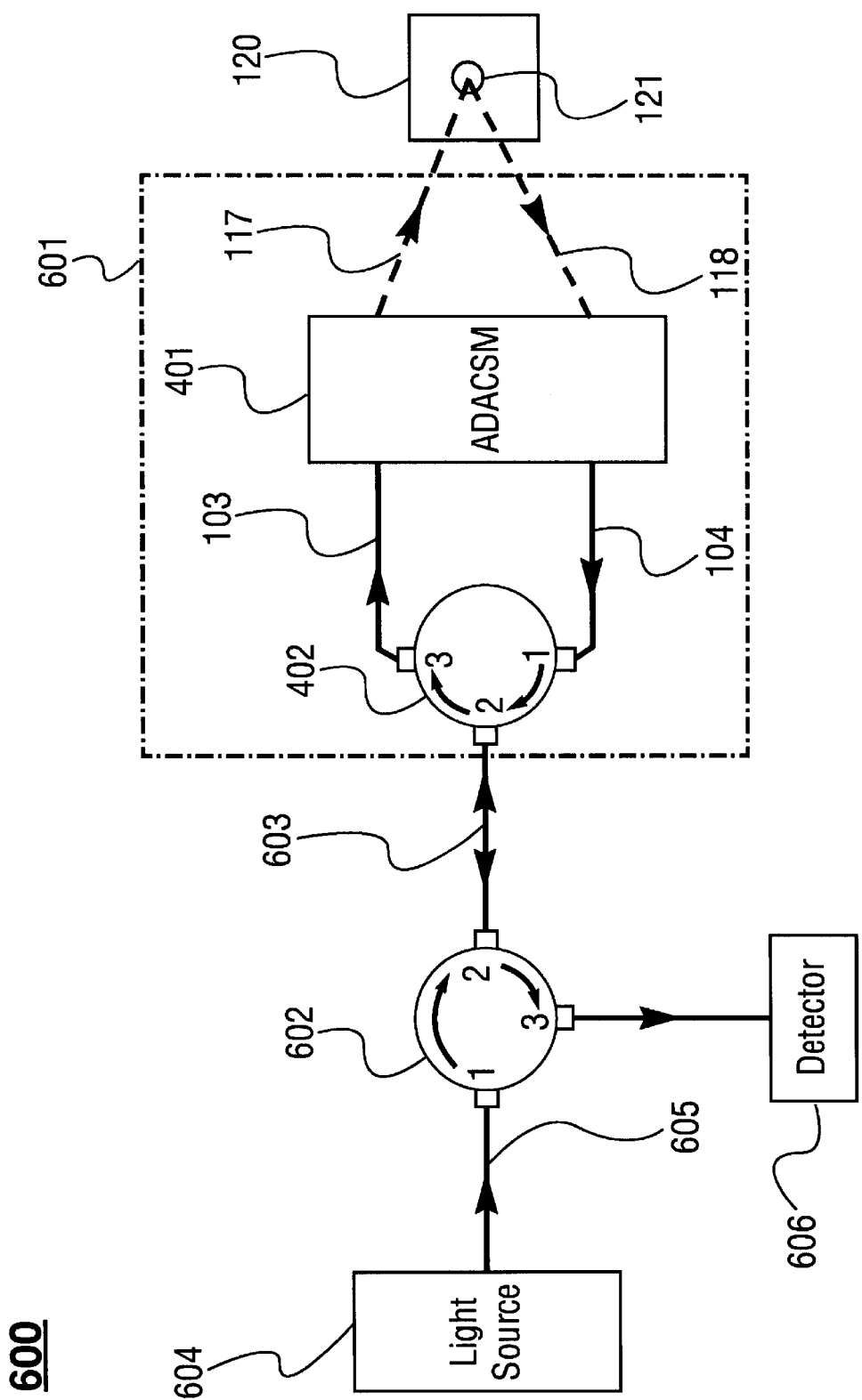
FIGS. 6A–6B depict simplified schematic diagrams of fourth and fifth angled-dual-axis confocal scanning systems according to the present invention.
Figure 6B:
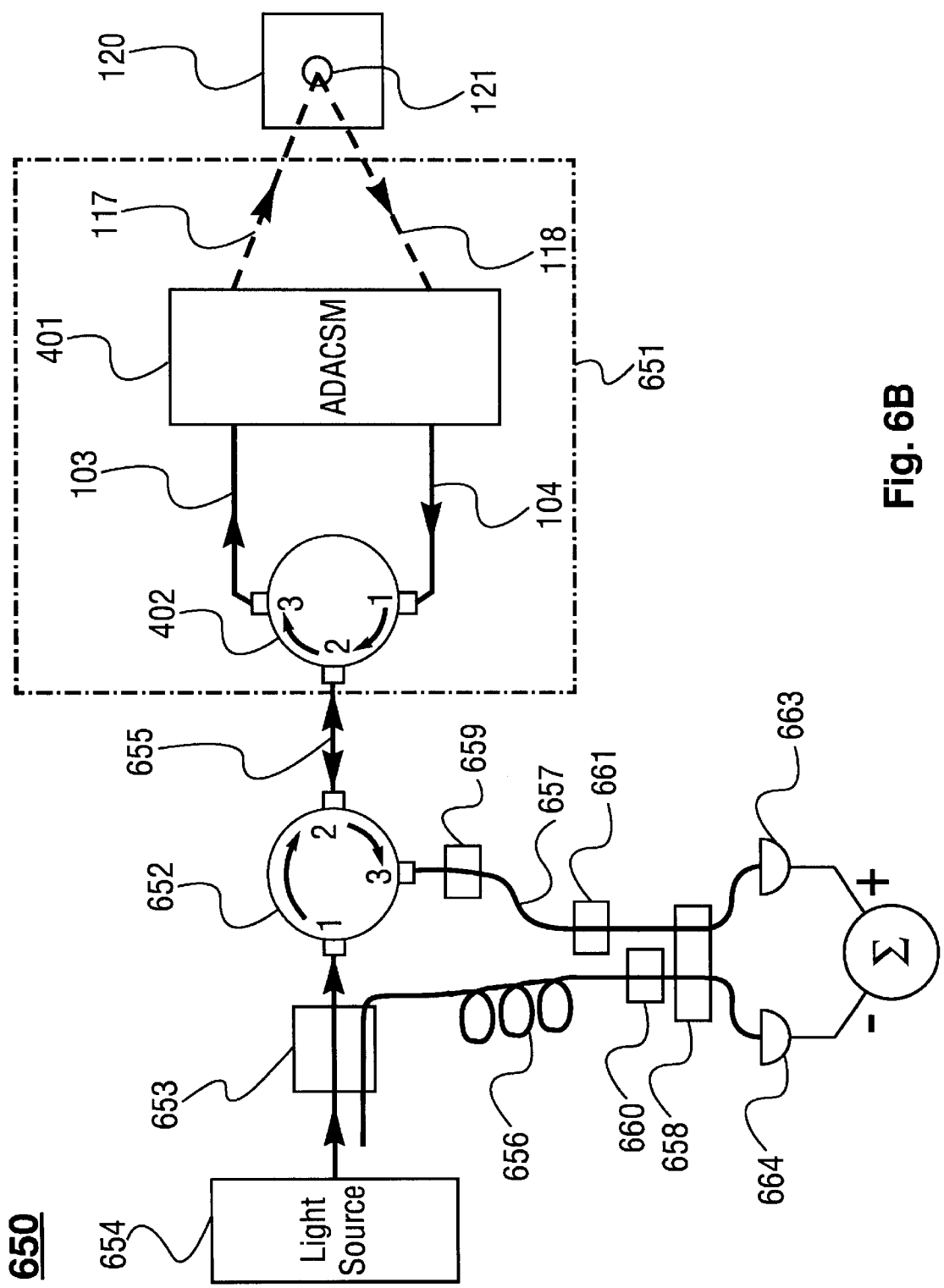

FIGS. 6A–6B depict simplified schematic diagrams of fourth and fifth angled-dual-axis confocal scanning systems of the present invention. Shown in FIG. 6A is the fourth angled-dual-axis confocal scanning system 600 of the present invention, comprising an angled-dual-axis confocal scanning module 601 optically coupled to a second optical circulator 602 by way of a third optical fiber 603, and a light source 604 optically coupled to second optical circulator 602 by way of a forth optical fiber 605. For the purpose of illustration, angled-dual-axis confocal scanning module 601 is in the form of the embodiment shown in FIG. 4, although any other embodiment in accordance with the present invention can be alternatively implemented. Third optical fiber 603 is optically coupled to port-2 of second optical circulator 602 on one end and to port-2 of angled-dual-axis confocal scanning module 601 on the other. Fourth optical fiber 605 in turn optically couples port-1 of second optical circulator 602 to light source 604. In operation, an illumination beam 117 emitted from light source 604 is transmitted to port-1 of and in turn passed onto port-2 of second optical circulator 602, and further transmitted to port-2 of angled-dual-axis confocal scanning module 601. An observation beam 118 collected by angled-dual-axis confocal scanning module 601 from confocal overlapping volume 121 within object 120 is routed back to port-2 of and in turn directed to port-3 of second optical circulator 602, to which an optical detector 606 is optically coupled.

In the aforementioned angled-dual-axis confocal scanning system, light source 604 can be a fiber laser, a semiconductor laser, or a diode-pumped solid state laser, or any other fiber-coupled light source known in the art, which operates in a continuous wave or pulsed mode. A skilled artisan can implement an appropriate light source suitable for a given application. Furthermore, the non-reciprocal nature of second optical circulator 602 allows nearly 100% of observation beam 118 to be used for detection, thereby maximizing the signal-to-noise ratio.

The embodiment shown in FIG. 6A can be further modified into an interferometer configuration, such that the observation beam is combined with a portion of the output beam from the light source to create coherent interference. This can be achieved by inserting a beam-splitting means, such as a fiber-optic coupler or a beamsplitter, between the light source and the second optical circulator in the above embodiment. FIG. 6B depicts the fifth angled-dual-axis confocal scanning system 650 of the present invention, comprising an angled-dual-axis confocal scanning module 651, a second optical circulator 652, a beam-splitting means in the form of first fiber-optic coupler 653, and a light source 654. For illustration purposes, angled-dual-axis confocal scanning module 651 is in the form of the embodiment shown in FIG. 4, although any other embodiment in accordance with the present invention can also be implemented. A third optical fiber 655 optically couples port-2 of angled-dual-axis confocal scanning module 651 to port-2 of second optical circulator 652. First fiber-optic coupler 653 is in optical communication with light source 654 and second optical circulator 652, such that it diverts a portion of an output beam from light source 654 to port-1 of second optical circulator 652 and a remainder of the output beam to a reference optical fiber 656, thereby creating an illumination beam 117 and reference beam from the same parent beam. Illumination beam 117 is in turn passed into port-2 of second optical circulator 652, and further transmitted to port-2 of angled-dual-axis confocal scanning module 651 by way of third optical fiber 655. An observation beam 118 collected by angled-dual-axis confocal scanning module 651 from confocal overlapping volume 121 within object 120 is routed back to port-2 of and in turn passed onto port-3 of second optical circulator 652, and further directed to a detection optical fiber 657. First, second, third, reference and detection fibers 103, 104, 655, 656, 657 have optical path lengths so selected to ensure optical coherence between the reference and observation beams. Reference optical fiber 656 and detection fiber 657 are joined by a second fiber-optic coupler 658, such that a balanced detection scheme can be employed for optimizing signal-to-noise ratio in detection.

To implement balanced detection, a frequency shifting means (or a phase modulator) in the form of frequency shifter 659 is optically coupled to detection optical fiber 657 for shifting the frequency of the observation beam, such that a heterodyne beat frequency is produced between the unshifted reference beam and the shifted observation beam at second fiber-optic coupler 658 and thus detected by two optical detectors 663, 664 at the two outputs of second fiber-optic coupler 658. Frequency shifter 659 can be alternatively coupled to first optical fiber 103, second optical fiber 104, third optical fiber 655, or disposed between first fiber-optic coupler 653 and port-1 of second optical circulator 652, for the same purpose of shifting the frequency of the observation beam. Moreover, frequency shifter 659 can be optically coupled to reference optical fiber 656 for shifting the frequency of the reference beam, such that a heterodyne beat frequency is produced between the shifted reference beam and the unshifted observation beam at the two outputs of fiber-optic coupler 658. The underlying principle of balanced detection and its advantages in fiber-optic interferometers are well known in the art, as described by Rollins et al. in "Optimal interferometer designs for optical coherence tomography", Optics Letters, 24(21), pp. 1484 (1999), and by Podoleanu in "Unbalanced versus balanced operation in an optical coherence tomography system", Applied Optics, 39(1), pp. 173 (2000), incorporated herein by reference.

Angled-dual-axis confocal scanning system 650 in FIG. 6B further comprises an adjustable optical delay device 660 optically coupled to reference optical fiber 656, serving to maintain coherent interference between the reference and observation beams. Adjustable Optical delay device 660 can be alternatively coupled to detection optical fiber 657, or anywhere else along the light path, for achieving the same purpose. In applications where light source 654 has a short coherence length, then delay device 660 can be adjusted such that only single-scattered light in observation beam 118 is coherent with the reference beam at second fiber-optic coupler 658 and multiple-scattered light which traverse over a larger optical path length in observation beam 118 does not contribute to the coherent interference, therefore providing further filtering of multiple-scattered light.

To further increase the signal-to-noise ratio in detection of weak optical signals, an optical amplifier 661, such as a two-port fiber amplifier or a semiconductor optical amplifier, is optically coupled to detection optical fiber 657 in the embodiment of FIG. 6B, to boost up the power of the observation beam. Optical amplifier 661 can be alternatively coupled to second optical fiber 104, for the purpose of amplifying the observation beam. An amplified observation beam has an additional advantage of allowing faster scanning rates and consequently higher pixel rates without appreciable loss in the signal-to-noise ratio of detection, because a shorter integration time per pixel of an image is required in data collection. The implementation of balanced detection in this case also allows subtraction of optical amplifier noise, since most of spontaneous emission of optical amplifier 661 would not occur at the heterodyne beat frequency described above.

Light source 654 in FIG. 6B can be an optical fiber amplifier, a semiconductor optical amplifier, a fiber laser, a semiconductor laser, a diode-pumped solid state laser, or any other continuous wave or pulsed broadband OCT light source having a short coherence length, as is well known in the art. For biological or medical applications, the light source should produce light in the wavelength range of about 0.8 to 1.6 microns, since biological tissues are particularly transparent in this range. The various optical fibers are preferably of single-mode type, for single-mode fibers offer the advantage of simplicity and automatic assurance of the mutual spatial coherence of the observation and reference beams upon detection. If a polarized light beam is provided by light source 654, first fiber-optic coupler 653 should be a polarization maintaining coupler. Various optical fibers in the system should be polarization maintaining fibers, capable of supporting two orthogonal polarizations. First and second optical circulators 402, 652 should also be polarization maintaining. In this case, the reference and observation beams can be brought into the same polarization by rotating either reference optical fiber 656, or detection optical fiber 657, before coupling it to second fiber-optic coupler 658. Alternatively, a polarization rotation means, such as a Faraday rotator, can be coupled to either reference optical fiber 656, or detection optical fiber 657, such that the reference and observation beams have substantially the same polarization when combined. Furthermore, second fiber-optic coupler 658 should be a polarization maintaining fiber coupler to optimally mix the polarized observation and reference beams. All in all, by carefully controlling the polarizations of the beams in angled-dual-axis confocal scanning system 650, the single-to-noise ratio of detection can be enhanced.

In the angled-dual-axis confocal scanning systems described above, fiber-optic couplers are used to serve as beam-splitting means. Optical fibers, preferably single-mode fibers, are employed for the purpose of providing optical coupling. Optical circulators are preferably fiber-coupled circulators. These fiber-optic components, along with the fiber-coupled angled-dual-axis confocal scanning module of the present invention, enable the confocal scanning systems thus constructed to be all fiber-based systems, hence fully exploiting the flexibility, scalability, ruggedness and economical value afforded by optical fibers.

Alternatively, those skilled in the art may substitute the fiber-optic couplers and optical circulators by other types of beam-splitting and beam-routing means, such as assemblies of beamsplitters, prisms, and birefrigent elements, and the optical fibers by other types of free space or bulk optical coupling means well known in the art, in the angled-dual-axis confocal scanning systems of the present invention without deviating from the principle and the scope of the present invention. Further, the methods for detection of optical signals and for electronic processing of the detected signals into images are well known in the art. A skilled artisan can make suitable design choices for a given application.

All in all, the angled-dual-axis confocal scanning microscope of the present invention provides many advantages over the prior art systems, most notably: enhanced axial resolution while maintaining a workable working distance and a large field of view, low noise, versatile scanning, and an integrated, simple and scalable structure. Moreover, by using low NA focusing elements (or lenses), the angled-dual-axis confocal scanning microscope of the present invention is capable of minimizing multiple-scattered light, thereby achieving higher sensitivity and larger dynamic range upon detection, a capability particularly desirable for imaging within a scattering medium. Additionally, the integration of the angled-dual-axis confocal scanning microscope of the present invention with fiber-optic components and a fiber-coupled laser provides an assembly of fiber-based angled-dual-axis confocal scanning systems that can be particularly powerful tools for low noise imaging in biological and medical applications.

Although the present invention and its advantages have been described in detail, it should be understood that various changes, substitutions, and alternations can be made herein without departing from the principle and the scope of the invention. Accordingly, the scope of the present invention should be determined by the following claims and their legal equivalents.

What is claimed is:

1. An angled-dual-axis confocal scanning system comprising:
    a) an angled-dual-axis confocal head comprising:
        i) a first optical fiber having first and second ends, for providing an illumination beam at said first end;
        ii) a second optical fiber having first and second ends; and
        iii) an angled-dual-axis focusing means for focusing said illumination beam to an illumination focal volume along an illumination axis within an object and for receiving an observation beam emanated from an observation focal volume along an observation axis within said object such that said observation beam is focused onto said first end of said second optical fiber;
        wherein said illumination axis and said observation axis intersect at an angle within said object, such that said illumination focal volume and said observation focal volume intersect optimally at a confocal overlapping volume; and
    b) a vertical scanning unit comprising:
        i) a vertical translation means mechanically coupled to said angled-dual-axis confocal head; and
        ii) a compensation means for ensuring said optimal intersection of said illumination focal volume and said observation focal volume;
        wherein said vertical translation means is capable of causing said angled-dual-axis confocal head to move relative to said object along a vertical direction, such that said confocal overlapping volume deepens progressively into said object, thereby producing a vertical scan.

2. The angled-dual-axis confocal scanning system of claim 1 wherein said compensation means comprises a fluid filling a space between said angled-dual-axis focusing means and said object, wherein said fluid is substantially transparent to said illumination beam and said observation beam, and wherein said fluid has an index of refraction that is substantially the same as an index of refraction of said object, such that the optical path lengths of said illumination beam and said observation beam remain substantially unchanged in the course of said vertical scan.

3. The angled-dual-axis confocal scanning system of claim 2 further comprising a window assembly interposed between said angled-dual-axis focusing means and said fluid for passage of said illumination and observation beams.

4. The angled-dual-axis confocal scanning system of claim 3 wherein said window assembly comprises a substantially transparent flat window.

5. The angled-dual-axis confocal scanning system of claim 3 wherein said window assembly comprises first and second substantially transparent flat windows in an angled arrangement, such that said illumination axis is substantially perpendicular to said first flat window and said observation axis is substantially perpendicular to said second flat window.

6. The angled-dual-axis confocal scanning system of claim 2 further comprising a substantially transparent window interposed between said fluid and said object for passage of said illumination and observation beams.

7. The angled-dual-axis confocal scanning system of claim 2 wherein said fluid is contained in a sealed hydraulic system, including a reservoir for replenishing and receiving excess fluid in the course of said vertical scan.

8. The angled-dual-axis confocal scanning system of claim 1 further comprising a transverse stage mechanically coupled to said object, wherein said transverse stage causes said object to move relative to said angled-dual-axis confocal head along transverse directions perpendicular to said vertical direction, such that said confocal overlapping volume moves across said object along said transverse directions, thereby producing a transverse scan.

9. The angled-dual-axis confocal scanning system of claim 8 wherein said transverse stage comprises a substantially transparent window for passage of said illumination and observation beams, and wherein said window is in close contact with said object.

10. The angled-dual-axis confocal scanning system of claim 1 wherein said angled-dual-axis focusing means comprises one or more elements selected from the group consisting of refractive lenses, diffractive lenses, GRIN lenses, focusing gratings, micro-lenses, holographic optical elements, binary lenses, curved mirrors, flat mirrors, and prisms.

11. The angled-dual-axis confocal scanning system of claim 10 wherein said angled-dual-axis focusing means comprises a single illumination-observation focusing element, where said illumination-observation element provides said illumination axis and said observation axis.

12. The angled-dual-axis confocal scanning system of claim 11 further comprising a first collimating lens, wherein said first collimating lens receives said illumination beam from said first end of said first optical fiber and passes a substantially collimated illumination beam to said illumination-observation focusing element.

13. The angled-dual-axis confocal scanning system of claim 12 further comprising a second collimating lens, wherein said second collimating lens receives said observation beam from said illumination-observation focusing element and focuses said observation beam to said first end of said second optical fiber.

14. The angled-dual-axis confocal scanning system of claim 10 wherein said angled-dual-axis focusing means comprises an illumination focusing element and an observation focusing element, wherein said illumination focusing element provides said illumination axis, and wherein said observation focusing element provides said observation axis.

15. The angled-dual-axis confocal scanning system of claim 14 wherein said illumination focusing element and said observation focusing element are of the same type, comprising a focusing element selected from the group consisting of refractive lenses, diffractive lenses, GRIN lenses, micro-lenses, binary lenses, and curved mirrors.

16. The angled-dual-axis confocal scanning system of claim 15 wherein said focusing element has a numerical aperture (NA) in the range of 0.1 to 0.4.

17. The angled-dual-axis confocal scanning system of claim 14 further comprising a first collimating lens, wherein said first collimating lens receives said illumination beam from said first end of said first optical fiber and passes a substantially collimated illumination beam to said illumination focusing element.

18. The angled-dual-axis confocal scanning system of claim 17 further comprising a second collimating lens, wherein said second collimating lens receives said observation beam from said observation focusing element and focuses said observation beam to said first end of said second optical fiber.

19. The angled-dual-axis confocal scanning system of claim 14 further comprising one or more mirrors for beam-aligning and beam-deflecting, wherein said one or more mirrors receive said illumination beam from said illumination focusing element and direct said illumination beam to said illumination focal volume within said object, and wherein said one or more mirrors collect said observation beam emanated from said observation focal volume and pass said observation beam to said observation focusing element.

20. The angled-dual-axis confocal scanning system of claim 1 wherein said angled-dual-axis confocal head is mechanically coupled to a substrate.

21. The angled-dual-axis confocal scanning system of claim 20 wherein said substrate comprises a silicon substrate etched with V-grooves.

22. The angled-dual-axis confocal scanning system of claim 1 wherein either of said first and second optical fibers comprises an element selected from the group consisting of single-mode fibers, polarization maintaining fibers, multi-mode fibers, and birefrigent fibers.

23. The angled-dual-axis confocal scanning system of claim 22 wherein each of said first and second optical fibers comprises a single-mode fiber.

24. The angled-dual-axis confocal scanning system of claim 1 wherein said observation beam comprises reflected light emanated from said confocal overlapping volume within said object.

25. The angled-dual-axis confocal scanning system of claim 1 wherein said observation beam comprises fluorescent light emanated from said confocal overlapping volume within said object.

26. The angled-dual-axis confocal scanning system of claim 1 wherein said illumination focal volume and said observation focal volume are diffraction-limited, determined by main lobes of said illumination beam's point-spread function and said observation beam's point-spread function.

27. The angled-dual-axis confocal scanning system of claim 26 wherein said confocal overlapping volume is diffraction-limited.

28. The angled-dual-axis confocal scanning system of claim 1 wherein said illumination beam is a polarized beam, and wherein first and second optical fibers are polarization maintaining fibers.

29. The angled-dual-axis confocal scanning system of claim 1 further comprising a light source optically coupled to said second end of said first optical fiber.

30. The angled-dual-axis confocal scanning system of claim 29 wherein said light source comprises an element selected from the group consisting of optical fiber amplifiers, fiber lasers, semiconductor optical amplifiers, semiconductor lasers, and diode-pumped solid state lasers.

31. The angled-dual-axis scanning confocal system of claim 29 wherein said light source comprises a polarized light source, wherein said first and second optical fibers are polarization maintaining fibers, and wherein said second end of said second optical fiber is optically coupled to a polarizing beamsplitter.

32. The angled-dual-axis confocal scanning system of claim 31 further comprising two optical detectors, optically coupled to said polarizing beamsplitter.

33. The angled-dual-axis confocal scanning system of claim 1 further comprising one or more optical detectors optically coupled to said second end of said second optical fiber.

34. The angled-dual-axis confocal scanning system of claim 33 wherein said one or more optical detectors comprise one or more elements selected from the group consisting of PIN diodes, avalanche photo diodes, and photo-multipler tubes.

35. The angled-dual-axis confocal scanning system of claim 1 further comprising a first optical circulator having first, second, and third ports, wherein said third port is optically coupled to said second end of said first optical fiber, wherein said first port is optically coupled to said second end of said second optical fiber, and wherein said second port provides a bi-directional input/output port.

36. The angled-dual-axis confocal scanning system of claim 35 further comprising a self-detecting laser source having first and second output apertures, wherein said first output aperture is optically coupled to said second port of said first optical circulator, and wherein said second output aperture is optically coupled to an optical detector.

37. The angled-dual-axis confocal scanning system of claim 36 wherein said self-detecting laser source comprises an element selected from the group consisting of fiber lasers, semiconductor lasers, and diode-pumped solid state lasers.

38. The angled-dual-axis confocal scanning system of claim 36 further comprising a frequency shifting means optically coupled to said second optical fiber, for shifting the frequency of said observation beam.

39. The angled-dual-axis confocal scanning system of claim 36 further comprising a frequency shifting means optically coupled to said first optical fiber, for shifting the frequency of said illumination beam.

40. The angled-dual-axis confocal scanning system of claim 36 further comprising a frequency shifting means in optical communication with said self-detecting light source and said first optical circulator, for shifting the frequency of said observation beam.

41. The angled-dual-axis confocal scanning system of claim 35 further comprising a self-detecting laser source having a single output aperture, wherein said output aperture is optically coupled to said second port of said first optical circulator via a beam-splitting means, such that said beam-splitting means routes a portion of an output beam emitted from said output aperture to said second port of said first optical circulator and a remainder of said output beam to an optical detector.

42. The angled-dual-axis confocal scanning system of claim 41 wherein said self-detecting light source comprises an element selected from the group consisting of fiber lasers, semiconductor lasers, and diode-pumped solid state lasers.

43. The angled-dual-axis confocal scanning system of claim 41 wherein said beam-splitting means comprises an element selected from the group consisting of fiber-optic couplers, polarization maintaining fiber-optic couplers, beamsplitters, and polarizing beamsplitters.

44. The angled-dual-axis confocal scanning system of claim 41 further comprising a frequency shifting means optically coupled to said second optical fiber, for shifting the frequency of said observation beam.

45. The angled-dual-axis confocal scanning system of claim 41 further comprising a frequency shifting means optically coupled to said first optical fiber, for shifting the frequency of said illumination beam.

46. The angled-dual-axis confocal scanning system of claim 41 further comprising a frequency shifting means in optical communication with said beam-splitting means and said first optical circulator, for shifting the frequency of said observation beam.

47. The angled-dual-axis confocal scanning system of claim 35 further comprising a second optical circulator having first, second and third ports, wherein said second port is optically coupled to said second port of said first optical circulator.

48. The angled-dual-axis confocal scanning system of claim 47 wherein said second port of said second optical circulator is optically coupled to said second port of said first optical circulator via a third optical fiber.

49. The angled-dual-axis confocal scanning system of claim 47 further comprising a light source, wherein said first port of said second optical circulator is optically coupled to said light source.

50. The angled-dual-axis confocal scanning system of claim 49 further comprising an optical detector, optically coupled to said third port of said second optical circulator.

51. The angled-dual-axis confocal scanning system of claim 49 wherein said light source is optically coupled to said first port of said second optical circulator via a beam-splitting means, such that said beam-splitting means routes a portion of an output beam emitted from said light source to said first port of said second optical circulator, providing said illumination beam, and wherein a remainder of said output beam provides a reference beam.

52. The angled-dual-axis confocal scanning system of claim 51 wherein said beam-splitting means comprises a first fiber-optic coupler, and wherein said reference beam is routed to a reference optical fiber.

53. The angled-dual-axis confocal scanning system of claim 52 further comprising a detection optical fiber optically coupled to said third port of second optical circulator, wherein said reference optical fiber and said detection optical fiber are coupled by a second fiber-optic coupler.

54. The angled-dual-axis confocal scanning system of claim 53 further comprising a frequency shifting means optically coupled to said reference optical fiber, for shifting the frequency of said reference beam.

55. The angled-dual-axis confocal scanning system of claim 53 further comprising a frequency shifting means optically coupled to said detection optical fiber, for shifting the frequency of said observation beam.

56. The angled-dual-axis confocal scanning system of claim 53 further comprising an optical amplifier optically coupled to said detection optical fiber, for amplifying said observation beam.

57. The angled-dual-axis confocal scanning system of claim 53 further comprising an adjustable optical delay device optically coupled to said detection optical fiber.

58. The angled-dual-axis confocal scanning system of claim 53 further comprising an adjustable optical delay device optically coupled to said reference optical fiber.

59. The angled-dual-axis confocal scanning system of claim 53 further comprising one or more optical detectors, optically coupled to said second fiber optic coupler.

60. The angled-dual-axis confocal scanning system of claim 51 further comprising a frequency shifting means optically coupled to said second optical fiber, for shifting the frequency of said observation beam.

61. The angled-dual-axis confocal scanning system of claim 51 further comprising a frequency shifting means optically coupled to said first optical fiber, for shifting the frequency of said illumination beam.

62. The angled-dual-axis confocal scanning system of claim 51 further comprising a frequency shifting means in optical communication with said second port of said second optical circulator and said second port of said first optical circulator, for shifting the frequency of said observation beam.

63. The angled-dual-axis confocal scanning system of claim 51 further comprising a frequency shifting means optically coupled to said third port of said second optical circulator, for shifting the frequency of said observation beam.

64. The angled-dual-axis confocal scanning system of claim 51 further comprising a frequency shifting means in optical communication with said beam-splitting means, for shifting the frequency of said reference beam.

65. The angled-dual-axis confocal scanning system of claim 51 further comprising an optical amplifier optically coupled to said second optical fiber, for amplifying said observation beam.

66. The angled-dual-axis confocal scanning system of claim 51 further comprising an optical amplifier optically coupled to said third port of said second optical circulator, for amplifying said observation beam.

67. The angled-dual-axis confocal scanning system of claim 51 further comprising an optical delay device for adjusting an optical path length of said reference beam.

68. The angled-dual-axis confocal scanning system of claim 51 further comprising an optical delay device for adjusting an optical path length of said observation beam.

69. A method of performing angled-dual-axis confocal scanning microscopy within a sample, comprising:
   a) transmitting an illumination beam emerging from a first end of a first optical fiber to an angled-dual-axis focusing means;
   b) directing said illumination beam from said angled-dual-axis focusing means to an illumination focal volume along an illumination axis within said sample;
   c) using said angled-dual-axis focusing means to collect an observation beam emanated from an observation focal volume along an observation axis within said sample, wherein said illumination axis and said observation axis intersect at an angle within said sample, such that said illumination focal volume and said observation focal volume intersect optimally at a confocal overlapping volume;
   d) focusing said observation beam to a first end of a second optical fiber;
   e) filling a space between said angled-dual-axis focusing means and said sample with a fluid substantially transparent to said illumination beam and said observation beam, and wherein said fluid has an index of refraction that is substantially the same as an index of refraction of said sample; and
   f) moving said first ends of said first and second optical fibers and said angled-dual-axis focusing means in unity relative to said sample in a vertical direction, such that said confocal overlapping volume deepens progressively into said sample, thereby producing a vertical scan.

70. The method of claim 69 wherein said vertical scan comprises a vertical-line scan.

71. The method of claim 70 further comprising the step of translating said sample incrementally along a transverse direction perpendicular to said vertical direction, after completing said vertical-line scan.

72. The method of claim 69 further comprising the step of translating said sample along transverse directions perpendicular to said vertical direction, such that said confocal overlapping volume effectively moves across said sample along said transverse directions, thereby producing a transverse scan.

73. The method of claim 72 wherein said transverse scan comprises a transverse cross-section scan, and wherein said method further comprises the step of repeating said step f) after completing said transverse cross-section scan.

74. The method of claim 69 further comprising the step of disposing a window assembly between said angled-dual-axis focusing means and said fluid for passage of said illumination and observation beams.

75. The method of claim 69 further comprising the step of disposing a substantially transparent window between said fluid and said sample for passage of said illumination and observation beams.

76. The method of claim 69 further comprising the step of mechanically coupling said first ends of said first and second optical fibers and said angled-dual-axis focusing means to a substrate.

77. The method of claim 76 wherein said substrate is a silicon substrate, and wherein said method further comprises the step of etching V-grooves on said silicon substrate.

78. The method of claim 69 further comprising the step of coupling a second end of said first optical fiber to a light source and a second end of said second optical fiber to an optical detector, such that said illumination beam is transmitted from said light source and said observation beam is routed to said optical detector.

79. The method of claim 69 further comprising the step of coupling a second end of said first optical fiber to a third port of and a second end of said second optical fiber to a first port of a three-port optical circulator.

80. The method of claim 79 further comprising the step of coupling a second port of said optical circulator to a first output aperture of a self-detecting light source and coupling a second output aperture of said self-detecting light source to an optical detector, such that said illumination beam is transmitted from said first output aperture and said observation beam is back coupled to said first output aperture.

81. The method of claim 79 further comprising the step of coupling a second port of said optical circulator to a second port of an auxiliary three-port optical circulator, a first port of said auxiliary optical circulator to a light source, and a third port of said auxiliary optical circular to a first end of a detection optical fiber, such that said illumination beam originates from said light source and said observation beam is routed to said detection optical fiber.

82. The method of claim 81 further comprising the step of coupling a beam-splitting means between said light source and said first port of said auxiliary optical circulator, such that said beam-splitting means routes a portion of an output beam emitted from said light source to said first port of said auxiliary optical circulator, providing said illumination beam, and a remainder of said output beam to a first end of a reference optical fiber, providing a reference beam.

83. The method of claim 82 further comprising the step of combining and detecting coherent interference between said reference beam and said observation beam.

84. The method of claim 83 further comprising the step of shifting the frequency of said observation beam and using heterodyne detection to detect coherent interference between said reference beam and said observation beam.

85. The method of claim 83 further comprising the step of shifting the frequency of said reference beam and using heterodyne detection to detect coherent interference between said reference beam and said observation beam.

86. The method of claim 83 further comprising the step of implementing a balanced detection scheme.

87. The method of claim 83 further comprising the step of adjusting an optical path length of said observation beam relative to an optical path length of said reference beam, to provide said coherent interference.

88. The method of claim 83 further comprising the step of adjusting an optical path length of said reference beam relative to an optical path length of said observation beam, to provide said coherent interference.

89. The method of claim 83 further comprising the step of adjusting an optical path length of said illumination beam relative to an optical path length of said reference beam, to provide said coherent interference.

* * * * *